US011146467B2

(12) United States Patent
Leon-Garcia et al.

(10) Patent No.: US 11,146,467 B2
(45) Date of Patent: Oct. 12, 2021

(54) SYSTEMS, METHODS AND COMPUTER PROGRAM PRODUCTS FOR SCALABLE, LOW-LATENCY PROCESSING OF STREAMING DATA

(71) Applicant: StreamWorx.AI Inc., Toronto (CA)

(72) Inventors: Alberto Leon-Garcia, Toronto (CA); Hadi Bannazadeh, Thornhill (CA)

(73) Assignee: StreamWorx.AI Inc., Toronto (CA)

( * ) Notice: Subject to any disclaimer, the term of this patent is extended or adjusted under 35 U.S.C. 154(b) by 0 days.

(21) Appl. No.: 16/553,226

(22) Filed: Aug. 28, 2019

(65) Prior Publication Data

US 2020/0076710 A1    Mar. 5, 2020

Related U.S. Application Data

(60) Provisional application No. 62/724,789, filed on Aug. 30, 2018.

(51) Int. Cl.
*H04L 12/26* (2006.01)
*H04L 29/06* (2006.01)

(52) U.S. Cl.
CPC ........ *H04L 43/04* (2013.01); *H04L 29/06122* (2013.01); *H04L 69/168* (2013.01)

(58) Field of Classification Search
CPC . H04L 43/04; H04L 29/06122; H04L 69/168; G06F 3/0604; G06F 3/0644; G06F 9/0604; G06F 9/3869
See application file for complete search history.

(56) References Cited

U.S. PATENT DOCUMENTS 9,015,339 B2    4/2015  Branson et al.
9,516,053 B1 *  12/2016 Muddu .................. G06N 5/022
(Continued)

FOREIGN PATENT DOCUMENTS

CA         2244333 C      2/1999
WO      2018019232 A1    2/2018

OTHER PUBLICATIONS

Cejka et al., "NEMEA: A Framework for Network Traffic Analysis", 12th International Conference on Network and Service Management (CNSM), IFIP, 2016, Montreal, QC, Canada, pp. 195-201.
(Continued)

*Primary Examiner* — Todd L Barker
(74) *Attorney, Agent, or Firm* — Bereskin & Parr LLP/S.E.N.C.R.L. s.r.l.; Isis E. Caulder; T. Cameron Gale

(57) ABSTRACT

A system for processing network flow monitoring data includes a data collection input coupled to at least one incoming data stream; a load balancing operator is operable to distribute the network monitoring messages amongst a plurality of downstream processing units; a plurality of collector processing sub-units downstream from the load balancing operator are operable to generate network flow records from the received network monitoring messages in a first format; a plurality of parser sub-units coupled to the plurality of collector processing sub-units are operable to generate parsed network flow records by converting the received network flow records from the first format to a second format; and a combiner operator coupled to the plurality of parser sub-units is operable to combine the parsed network flow records from the plurality of parser sub-units into a synchronous output data stream.

21 Claims, 18 Drawing Sheets

(56) References Cited

U.S. PATENT DOCUMENTS

| | | | | |
|---|---|---|---|---|
| 9,830,188 | B2* | 11/2017 | Li | G06F 9/5011 |
| 9,858,322 | B2* | 1/2018 | Theimer | G06F 16/254 |
| 10,341,347 | B1* | 7/2019 | Boggs | H04L 67/1097 |
| 10,628,424 | B2* | 4/2020 | Park | G06F 16/24532 |
| 2004/0221004 | A1* | 11/2004 | Chalfin | H04L 69/16 |
| | | | | 709/203 |
| 2005/0097217 | A1* | 5/2005 | Vai | H04L 41/0896 |
| | | | | 709/233 |
| 2013/0346446 | A9 | 12/2013 | Jiménez Peris et al. | |
| 2014/0330926 | A1* | 11/2014 | Nano | H04L 67/22 |
| | | | | 709/217 |
| 2015/0205967 | A1* | 7/2015 | Naedele | G06F 21/606 |
| | | | | 713/189 |
| 2015/0242772 | A1* | 8/2015 | Backof, II | G06Q 10/0631 |
| | | | | 705/7.12 |
| 2015/0355957 | A1* | 12/2015 | Steiner | G06F 11/079 |
| | | | | 714/37 |
| 2016/0226826 | A1* | 8/2016 | Pan | H04L 67/1095 |
| 2017/0063965 | A1* | 3/2017 | Grenader | H04L 67/22 |
| 2017/0277616 | A1* | 9/2017 | Topiwala | G06F 11/3636 |
| 2018/0074786 | A1* | 3/2018 | Oberbreckling | G06F 7/02 |
| 2018/0176174 | A1* | 6/2018 | Sherman | H04L 45/302 |
| 2018/0246934 | A1* | 8/2018 | Arye | G06F 16/27 |
| 2018/0267808 | A1* | 9/2018 | Bushev | G06F 16/24568 |
| 2018/0285250 | A1* | 10/2018 | Helsley | G06F 11/34 |
| 2018/0329644 | A1* | 11/2018 | Das | G06F 9/547 |
| 2019/0079740 | A1* | 3/2019 | Sharma | G06F 16/9535 |
| 2019/0129747 | A1* | 5/2019 | Kim | G06F 9/5011 |
| 2019/0310899 | A1* | 10/2019 | Oravivattanakul | G06F 21/62 |

OTHER PUBLICATIONS

Münz et al., "Real-time Analysis of Flow Data for Network Attack Detection", 10th IFIP/IEEE International Symposium on Integrated Network Management, IEEE, May 2007, Munich, Germany (9 pages).

Bartoš et al., "NEMEA: Framework for stream-wise analysis of network traffic", CESNET Technical Report Sep. 2013, 2014, 19 pages.

Bannazadeh et al., "Probabilistic Approach to Service Commitment in Service-Oriented Systems", 2008 IEEE congress on Services—Part I, Honolulu, HI, pp. 273-278.

Bannazadeh et al., "A Distributed Algorithm for Service Commitment in Allocating Services to Applications", The 2nd IEEE Asia-Pacific Services Computing Conference (APSCC), Tsukuba Science City, Japan, 2007, pp. 446-453.

Bannazadeh et al., "A Distributed Probabilistic Commitment Control Algorithm for Service-Oriented Systems", IEEE Transactions on Network and Service Management, Dec. 2010, vol. 7(4): 204-217.

Bannazadeh et al., "Online Optimization in Application Admission Control for Service Oriented Systems", IEEE Asia-Pacific Services Computing Conference, Yilan, Taiwan, 2008, pp. 482-487.

Bannazadeh, "Application-Oriented Networking through Virtualization and Service Composition", Ph.D. Thesis, Electrical and Computer Engineering Department, University of Toronto, 2010, pp. 1-228.

Bannazadeh et al., "Allocating Services to Applications using Markov Decision Processes", IEEE International conference on Service-Oriented Computing and Applications (SOCA'07), Newport Beach, California, 2007, 6 pages.

International Search Report and Written Opinion dated Oct. 25, 2019 in International Patent Application No. PCT/CA2019/051179 (13 pages).

Sperotto, "Flow-Based Intrusion Detection", CTIT Ph.D.-thesis Series No. 10-180, University of Twente, Centre for Telematics and Information Technology, 2010, The Netherlands, pp. 1-173.

* cited by examiner

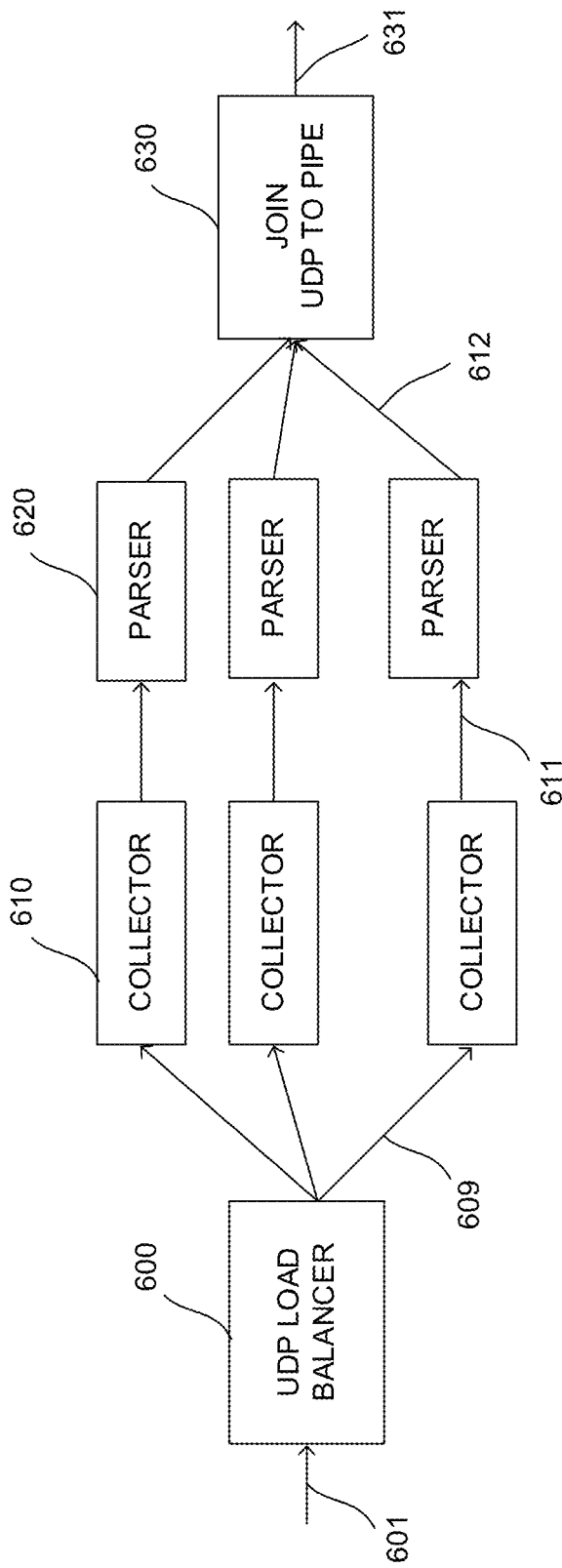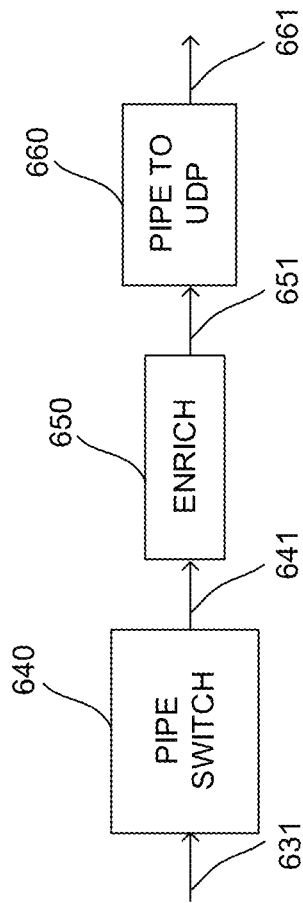
FIG. 6A
FIG. 6B

SYSTEMS, METHODS AND COMPUTER PROGRAM PRODUCTS FOR SCALABLE, LOW-LATENCY PROCESSING OF STREAMING DATA

CROSS-REFERENCE TO RELATED APPLICATION

This application claims priority from U.S. Provisional Patent Application Ser. No. 62/724,789, filed Aug. 30, 2018, the entire contents of which are hereby incorporated by reference.

FIELD

The described embodiments relate to data processing systems, and in particular to systems, methods and computer program products for collecting and processing large volumes of streaming data.

BACKGROUND

The following is not an admission that anything discussed below is part of the prior art or part of the common general knowledge of a person skilled in the art.

Electronic communications networks are a crucial part of the modern world. These communication networks enable individuals to access and disseminate large volumes of data/information. This data can include important, confidential and sensitive data for individuals or corporations. Accessing data using communication networks has become a routine and essential aspect of organizational operations.

As the world is becoming increasingly digitized, the volume of data shared and stored using electronic communication networks is increasing. The types and volume of sensitive data that is shared or accessible via these communication networks is also increasing. As a result, it is important to ensure that these communication networks remain operational. Additionally, it can be important to ensure that unauthorized access to communication networks can be reduced or prevented so that sensitive data can be protected.

In order to protect communication networks against issues such as faults or security breaches, a variety of network monitoring applications can be used. These applications gather information about the network and analyze the received data to detect events of interest such as faults, anomalies and intrusions. However, in order for these applications to operate successfully, the information must be provided in a format suitable for analysis. Providing the appropriate data for monitoring and analysis can be difficult, particularly when a large volume of data is collected. As more and more applications become reliant on communication networks, particularly with the emergence and growth of Internet of Things devices and applications, the volume and diversity of data generated within these networks will continue to increase dramatically.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In a first broad aspect, there is provided a system for processing streaming data. The system includes a data collection input coupled to at least one incoming data stream; a plurality of data processing sub-units, where each data processing sub-unit has a data input and a data output, and each data processing sub-unit is operable to receive an input data stream at the data input, modify data in the input data stream, and output an outgoing data stream that includes the modified data via the data output; a plurality of operators connecting the data collection input, the plurality of data processing sub-units, and at least one data output unit in a directed acyclic graph in which data flows from the data collection input through the plurality of data processing sub-units to the at least one data output unit; where, for at least some first data processing units, the data input of each data processing sub-unit in the at least some first data processing units is directly connected to a sub-unit input operator that transmits data using the User Datagram Protocol (UDP) and for at least some second data processing units the data output of each data processing sub-unit in the at least some second data processing units is directly connected to a sub-unit output operator that receives data using UDP.

In some embodiments, the system also includes a system manager coupled to the plurality of data processing sub-units and each data processing sub-unit includes a data buffer coupled to the data input where the system manager is configured to: monitor buffer usage of each data buffer; determine that buffer usage for a particular data buffer has reached a usage threshold; and modify the acyclic graph to reduce the buffer usage of the particular data buffer in response to the buffer usage reaching the usage threshold.

In some embodiments, the plurality of data processing sub-units includes at least one plurality of parallel sub-unit instances, each plurality of parallel sub-unit instances including at least two data processing sub-units each of which are operable to modify the data in the input data stream in the same manner and each data processing sub-unit in the at least two data processing sub-units is connected to the same preceding data processing sub-unit in the directed acyclic graph.

In some embodiments, the data output of the preceding data processing sub-unit is connected to an output duplicating operator that duplicates the outgoing data stream of the preceding data processing sub-unit using UDP multicast.

In some embodiments, the data output of the preceding data processing sub-unit is connected to a distributive operator that distributes the outgoing data stream of the preceding data processing sub-unit amongst the at least two data processing sub-units.

In some embodiments, the system also includes a system manager coupled to the at least one data output unit, the plurality of data processing sub-units and the plurality of operators, where the system manager is configured to: receive a processing request from the at least one data output unit; determine whether the directed acyclic graph is configured to satisfy the processing request; and upon determining that the directed acyclic graph is not configured to satisfy the processing request, modify the directed acyclic graph to enable the directed acyclic graph to satisfy the processing request.

In some embodiments, the system manager is configured to modify the directed acyclic graph while the system is operational.

In some embodiments, modifying the directed acyclic graph includes inserting at least one additional instance of one of the data processing sub-units into the directed acyclic graph.

In some embodiments, modifying the directed acyclic graph includes inserting at least one new data processing sub-unit into the directed acyclic graph.

In some embodiments, modifying the directed acyclic graph includes modifying at least one of the operators positioned between the plurality of data processing sub-units.

In some embodiments, the system also includes a system manager coupled to the at least one data output unit, the plurality of data processing sub-units and the plurality of operators, where the system manager is configured to limit the volume of data received at the data collection input from the at least one incoming data stream data that is transmitted to the directed acyclic graph.

In some embodiments, the system manager is further configured to: monitor the throughput of each of the data processing sub-units; and adjust the volume of data that is transmitted to the directed acyclic graph based on the monitored throughput.

In some embodiments, the system also includes a system manager coupled to the at least one data analysis application, the plurality of data processing sub-units and the plurality of operators, where the system manager is configured to: monitor the performance of each of the data processing sub-units; identify a performance deficiency in the monitored performance of at least one of the data processing sub-units; and modify the directed acyclic graph in response to the identified performance deficiency.

In some embodiments, the directed acyclic graph is defined as a plurality of data processing segments; where each data processing segment includes a sequence input operator, a data processing sequence that includes one or more data processing sub-units directly connected in sequence, and a sequence output operator; and an upstream end of the data processing sequence is connected to the sequence input operator and a downstream end of the data processing sequence is connected to the sequence output operator.

In some embodiments, the system also includes a particular plurality of parallel data processing segments, where each parallel data processing segment in the particular plurality of parallel data processing segments includes an instance of the same sequence input operator, an instance of the same data processing sequence, and an instance of the same sequence output operator.

In some embodiments, the at least one data output unit may include at least one of a data analysis application and a real-time storage application.

In some embodiments, the system may include a compression sub-unit upstream from the real-time storage application.

In some embodiments, the real-time storage application may be configured to store output data with time index data determined from the parsed network flow records.

In some embodiments the system may include a sequence of at least one parser sub-unit, at least one enrichment sub-unit and at least one compression, and the real-time storage application may be configured to store output data from the sequence of the at least one parser sub-unit, at least one enrichment sub-unit and at least one compression with time index data for subsequent retrieval. In some embodiments, the time index data is determined by the at least one parser sub-unit.

In accordance with an aspect of this disclosure there is provided a method for processing streaming data, the method including: receiving at least one incoming data stream; modifying the data in the incoming data stream using a plurality of data processing sub-units, where each data processing sub-unit is operable to receive an input data stream, modify data in the input data stream, and output an outgoing data stream that includes the modified data; routing the data from the incoming data stream through a directed acyclic graph to at least one data output unit, where the directed acyclic graph includes the plurality of data processing sub-units and a plurality of operators connecting the data collection input, the plurality of data processing sub-units, and the at least one data output unit, and the operators are operable to route the data through the directed acyclic graph; where routing the data through the incoming data stream includes, for at least some first data processing units, transmitting data to each data processing sub-unit in the at least some first data processing units using the User Datagram Protocol (UDP) and for at least some second data processing units transmitting data from each data processing sub-unit in the at least some second data processing units using UDP.

In some embodiments, the method also includes buffering the input data received at each of the data processing sub-units using a corresponding data buffer; monitoring the buffer usage of each data buffer; determining that buffer usage for a particular data buffer has reached a usage threshold; and modifying the acyclic graph to reduce the buffer usage of the particular data buffer in response to the buffer usage reaching the usage threshold.

In some embodiments, routing the data through the directed acyclic graph includes, for at least one data processing sub-unit, duplicating the outgoing data stream using UDP multicast and transmitting the duplicated outgoing data stream to a plurality of parallel sub-unit instances. In some embodiments, each sub-unit instance in the plurality of parallel sub-unit instances modifies the data in the outgoing data stream in the same manner. In other embodiments, some of the sub-unit instances in the plurality of parallel sub-unit instances may modify the data in the outgoing data stream in different ways.

In some embodiments, routing the data through the directed acyclic graph includes, for at least one data processing sub-unit, distributing the outgoing data stream amongst a plurality of parallel sub-unit instances, where each sub-unit instances in the plurality of parallel sub-unit instances modifies the data in the outgoing data stream in the same manner.

In some embodiments, the method also includes: receiving a processing request from the at least one data output unit; determining that the directed acyclic graph is not configured to satisfy the processing request; and upon determining that the directed acyclic graph is not configured to satisfy the processing request, modifying the directed acyclic graph to enable the directed acyclic graph to satisfy the processing request.

In some embodiments, the directed acyclic graph is modified while data is being routed through the directed acyclic graph.

In some embodiments, modifying the directed acyclic graph includes inserting at least one additional instance of one of the data processing sub-units into the directed acyclic graph.

In some embodiments, modifying the directed acyclic graph includes inserting at least one new data processing sub-unit into the directed acyclic graph.

In some embodiments, modifying the directed acyclic graph includes modifying the at least one of the operators positioned between the plurality of data processing sub-units.

In some embodiments, the method includes limiting a volume of data received at the data collection input from the at least one incoming data stream data that is transmitted to the directed acyclic graph.

In some embodiments, the method includes: monitoring the throughput of each of the data processing sub-units; and adjusting the volume of data that is transmitted to the directed acyclic graph based on the monitored throughput.

In some embodiments, the method includes: monitoring the performance of each of the data processing sub-units; identifying a performance deficiency in the monitored performance of at least one of the data processing sub-units; and modifying the directed acyclic graph in response to the identified performance deficiency.

In some embodiments, the at least one data output unit may include at least one of a data analysis application and a real-time storage application.

In accordance with an aspect of this disclosure there is provided a computer program product comprising a non-transitory computer-readable medium having computer-executable instructions stored therein, the computer-executable instructions being executable by a processor to configure the processor to perform a method for processing data, where the method includes: receiving at least one incoming data stream; modifying the data in the incoming data stream using a plurality of data processing sub-units, where each data processing sub-unit is operable to receive an input data stream, modify data in the input data stream, and output an outgoing data stream that includes the modified data; routing the data from the incoming data stream through a directed acyclic graph to at least one data output unit, where the directed acyclic graph includes the plurality of data processing sub-units and a plurality of operators connecting the data collection input, the plurality of data processing sub-units, and the at least one data output unit, and the operators are operable to route the data through the directed acyclic graph; where routing the data through the incoming data stream includes, for at least some first data processing units, transmitting data to each data processing sub-unit in the at least some first data processing units using the User Datagram Protocol (UDP) and for at least some second data processing units transmitting data from each data processing sub-unit in the at least some second data processing units using UDP.

In another broad aspect, there is provided a system for processing network flow monitoring data. The system includes a data collection input coupled to at least one incoming data stream of network monitoring messages; a load balancing operator coupled to the data collection input, the load balancing operator operable to distribute the network monitoring messages amongst a plurality of downstream processing units; a plurality of collector processing sub-units coupled to the load balancing operator downstream from the load balancing operator, each collector processing sub-unit operable to generate network flow records from the received network monitoring messages, where the network flow records are generated in a first format; a plurality of parser sub-units coupled to the plurality of collector processing sub-units, each parser sub-unit operable to receive the network flow records from one of the collector processing sub-units and to generate parsed network flow records by converting the received network flow records from the first format to a second format; and a combiner operator coupled to the plurality of parser sub-units, where the combiner operator is operable to combine the parsed network flow records from the plurality of parser sub-units into a synchronous output data stream.

In some embodiments, the load balancer operator is configured to transmit the network monitoring messages to the plurality of collector processing sub-units using the User Datagram Protocol (UDP).

In some embodiments, each collector processing sub-unit is configured to generate the network flow records in a JavaScript Object Notation format.

In some embodiments, each collector processing sub-unit is configured to transmit the network flow records to the corresponding parser sub-unit using the Transmission Control Protocol (TCP).

In some embodiments, each parser sub-unit is configured to generate the parsed network flow records in a CSV file format.

In some embodiments, each parser sub-unit is configured to transmit the parsed network flow records using the User Datagram Protocol (UDP).

In some embodiments, the system also includes at least one stream enrichment processing sub-unit coupled downstream from the combiner operator, each stream enrichment processing sub-unit operable to generate enriched network flow records by inserting enrichment data into the parsed network flow records.

In some embodiments, the at least one stream enrichment processing sub-unit includes a plurality of stream enrichment processing sub-units in parallel, and the system further includes: a switching operator coupling the plurality of stream enrichment processing sub-units to the combiner operator, the switching operator operable to direct the parsed network flow records to a subset of the stream enrichment sub-units in the plurality of stream enrichment sub-units.

In some embodiments, the plurality of stream enrichment processing sub-units includes a first subset of stream enrichment sub-units and a second subset of stream enrichment sub-units, where the first subset of stream enrichment sub-units corresponds to a first set of enrichment data and the second subset of stream enrichment sub-units corresponds to a different set of enrichment data; and the switching operator is operable to selectively direct the parsed network flow records to the stream enrichment processing sub-units in one of the first subset and the second subset while the stream enrichment processing sub-units are operational.

In some embodiments, the system includes a stream output operator coupled to the at least one stream enrichment processing sub-unit, the stream output operator configured to output the enriched network flow records using the User Datagram Protocol (UDP).

In some embodiments, the system includes a duplicator operator coupled downstream from the combiner operator, the duplicator operator configured to duplicate the received network flow records; and a plurality of feature extraction processing sub-units coupled to the duplicator operator, each feature extraction processing sub-unit operable to derive one or more network flow characteristics from the duplicated network flow records.

In some embodiments, the system includes a plurality of conditional operators coupled between the duplicator and the plurality of feature extraction processing sub-units, where each conditional operator is operable to selectively direct the network flow records between the plurality of feature extraction processing sub-units by determining that the network flow record has a characteristics corresponding to the selected feature extraction processing sub-unit.

In some embodiments, the system includes a filter operator coupled upstream from the duplicator, where the filter operator is operable to transmit network flow records having a defined set of characteristics to the duplicator and to prevent network flow records that do not have the defined set of characteristics from being transmitted to the duplicator.

In some embodiments, the system includes at least one data output unit coupled downstream of the combiner operator, where the at least one data output unit includes at least one of a data analysis application and a real-time storage application.

In some embodiments, the system may include a compression sub-unit upstream from the real-time storage application.

In some embodiments, the real-time storage application may be configured to store output data with time index data determined from the parsed network flow records.

In some embodiments the system may include a sequence of at least one parser sub-unit, at least one enrichment sub-unit and at least one compression, and the real-time storage application may be configured to store output data from the sequence of the at least one parser sub-unit, at least one enrichment sub-unit and at least one compression with time index data for subsequent retrieval. In some embodiments, the time index data is determined by the at least one parser sub-unit.

In accordance with a broad aspect there is provided a method of processing network flow monitoring data. The method includes: receiving at least one incoming data stream of network monitoring messages; distributing the network monitoring messages amongst a plurality of downstream processing units; generating, by a plurality of collector processing sub-units in the plurality of downstream processing units, network flow records from the received network monitoring messages, wherein the network flow records are generated in a first format; transmitting the network flow records to a plurality of parser processing sub-units downstream from the collector processing sub-units; generating, by the plurality of parser processing sub-units, parsed network flow records by converting the received network flow records from the first format to a second format; and combining the parsed network flow records from the plurality of parser sub-units into a synchronous output data stream.

In some embodiments, the network monitoring messages are distributed amongst the plurality of collector processing sub-units using the User Datagram Protocol (UDP).

In some embodiments, the network flow records are generated in a JavaScript Object Notation format.

In some embodiments, the network flow records are transmitted to the plurality of parser processing sub-units using the Transmission Control Protocol (TCP).

In some embodiments, the parsed network flow records are generated in a CSV file format.

In some embodiments, the parsed network flow records are output from the parser processing sub-units using the User Datagram Protocol (UDP).

In some embodiments, the method includes generating enriched network flow records by inserting enrichment data into the parsed network flow records.

In some embodiments, a plurality of stream enrichment processing sub-units are coupled in parallel to the synchronous output data stream and the method further includes: directing the parsed network flow records to a subset of the stream enrichment sub-units in the plurality of stream enrichment sub-units.

In some embodiments, the plurality of stream enrichment processing sub-units includes a first subset of stream enrichment sub-units and a second subset of stream enrichment sub-units, where the first subset of stream enrichment sub-units corresponds to a first set of enrichment data and the second subset of stream enrichment sub-units corresponds to a different set of enrichment data, and the method further includes selectively directing the parsed network flow records to the stream enrichment processing sub-units in one of the first subset and the second subset while the stream enrichment processing sub-units are operational.

In some embodiments, the method includes transmitting the enriched network flow records using the User Datagram Protocol (UDP).

In some embodiments, the method includes duplicating the network flow records; transmitting the duplicated network flow records to a plurality of feature extraction processing sub-units; and deriving, by each feature extraction processing sub-unit, one or more network flow characteristics from the duplicated network flow records.

In some embodiments, transmitting the duplicated network flow records to the plurality of feature extraction processing sub-units includes selectively directing each network flow record between the plurality of feature extraction processing sub-units by determining that the network flow record has a characteristic corresponding to the selected feature extraction processing sub-unit.

In some embodiments, the method includes filtering the network flow records prior to duplication, where network flow records having a defined set of characteristics are duplicated and network flow records that do not have the defined set of characteristics are prevented from passing through the filter.

In some embodiments, the method includes routing the output data stream to at least one data output unit, where the at least one data output unit includes at least one of a data analysis application and a real-time storage application.

In accordance with a broad aspect there is provided a computer program product comprising a non-transitory computer-readable medium having computer-executable instructions stored therein, the computer-executable instructions being executable by a processor to configure the processor to perform a method of processing network flow monitoring data, where the method includes: receiving at least one incoming data stream of network monitoring messages; distributing the network monitoring messages amongst a plurality of downstream processing units; generating, by a plurality of collector processing sub-units in the plurality of downstream processing units, network flow records from the received network monitoring messages, where the network flow records are generated in a first format; transmitting the network flow records to a plurality of parser processing sub-units downstream from the collector processing sub-units; generating, by the plurality of parser processing sub-units, parsed network flow records by converting the received network flow records from the first format to a second format; and combining the parsed network flow records from the plurality of parser sub-units into a synchronous output data stream.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings, in which:

FIGS. 6A-6B are block diagrams of data stream processing segments that may be used in the data stream processing systems of FIGS. 2A and 2B in accordance with an embodiment;

Figure 1:
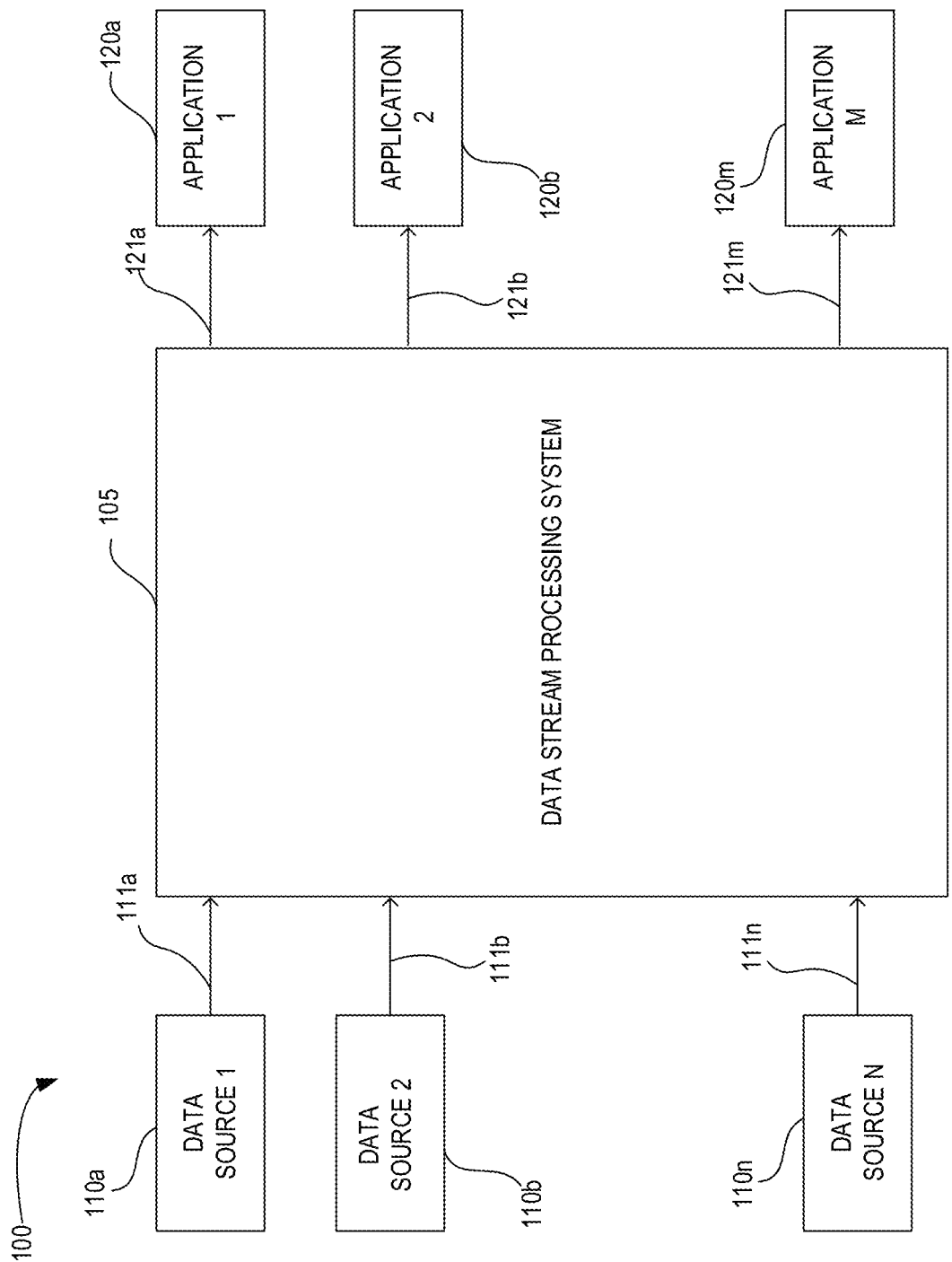
FIG. 1 is a block diagram of a data processing computer network system in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXEMPLARY EMBODIMENTS

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems, methods or computer program products having all of the features of any one system, method or computer program product described below or to features common to multiple or all of the systems or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. In addition, the description is not to be considered as limiting the scope of the embodiments described herein.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language such as object oriented programming. Accordingly, the program code may be written in C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage. The computer program product may also be capable of distribution through a communication network such as the Internet.

In order to protect communication networks against issues such as faults or security breaches, analysis and monitoring applications can be used to assess the status of the communication network. Data about the network, such as network flow data, syslog event data, DNS request data, and network topology data from various data sources can be collected on an ongoing basis as a stream of network related data. The network related data can be analyzed and monitored in an effort to detect network characteristics including events of interest such as faults, anomalies and intrusions. The data streams can also be monitored to identify and learn about other network characteristics such as patterns of behavior, demand, usage, and attacks among other information that may be useful in ensuring that the communication network remains secure and operational. The collected data may also be stored for later access and playback, e.g. for auditing purposes and/or to identify factors that may have contributed to a system fault.

As individuals and organizations continue to become increasingly reliant on communication networks to control and manage their day-to-day lives and business operations, the volume of data relevant to network monitoring and analysis will continue to increase. To ensure that network operations can be monitored effectively, it is important that large volumes of data can be assimilated and processed to provide network analysis and monitoring applications with meaningful input data. Real-time monitoring of network operations and security are also crucial in preventing or mitigating damage that may result from network faults or intrusions. Accordingly, rapid processing of network monitoring data may ensure that network analysis and monitoring application can provide real-time, or near real-time, feedback on the status of the communication network (and potential threats thereto).

Numerous different potential security and operational defects may arise in a communication network. Accordingly, numerous different analysis applications may be used to monitor the network status. The various analysis applications may require different types of input data (e.g. data in different formats or with different informational content) in order to detect a particular type of network event. Accordingly, incoming data streams may be processed to provide analysis applications with the correct type of data.

Embodiments described herein may provide systems, methods and computer program products that can be used to collect data from one or more data streams and extract information relevant to downstream monitoring and analysis applications. Embodiments described herein may collect and process one or more streams of input data and output one or more streams of processed data usable by the monitoring and/or analysis applications. The streams of processed data may also be stored for subsequent analysis by monitoring and/or analysis application. For example, the processed data may be stored with time index data to facilitate subsequent analysis of the processed data. The systems and methods described herein may perform various operations, such as selecting data streams and/or data items, extracting informational content from data streams and/or data items, and enriching data streams and/or data items for example.

Embodiments described herein may be configured to provide a data stream processing system. The data stream processing system can include one or more data inputs, each coupled to a source of streaming data. The data stream processing system can also include one or more data outputs. Each data output can be coupled to a data output unit. The data output unit can include at least one of a data analysis and/or monitoring application and a data storage application.

The data stream processing system can also include a plurality of data processing sub-units. Each data processing sub-unit may be operable to receive an input data stream and generate an outgoing data stream by modifying data in the input data stream. The data processing sub-unit can modify the data in the input stream so that the outgoing data stream can have different informational content or be formatted differently as compared to the input data stream.

The data processing system also includes a plurality of operators connecting the data inputs, the data processing sub-units and the data outputs. The plurality of data processing sub-units can be connected by the plurality of operators in a directed acyclic graph (i.e. a unidirectional processing graph). The plurality of data processing sub-units, and their interconnection in the processing graph, can be defined to process the incoming data streams and to generate processed data required by each of the downstream monitoring and analysis applications.

The plurality of data processing sub-units may be loosely coupled by the plurality of operators. That is, the plurality of operators may be adjustable to re-direct the flow of data between the plurality of data processing sub-units. The operators may be reconfigurable in real-time, i.e. while the system is operational and without interrupting operation of the data stream processing system.

The system may also include a central control system. The central control system can be configured to control and manage the deployment of the plurality of data processing sub-units. The control system may also be configured to control the deployment of the plurality of operators, and the interconnections between the data processing sub-units and the plurality of operators.

The control system may include one or more system monitoring components. The system monitoring components can generate monitoring data indicating the status of a data processing sub-unit or operator. For instance, in some cases each data processing sub-unit and/or each operator may have an associated monitoring component. Alternatively, each monitoring component may monitor a plurality of data processing sub-units and/or operators. The monitoring components may provide the monitoring data to the control system to enable the control system to re-configure the processing system as required.

The system monitoring components can monitor the status and performance of the data processing sub-units and/or operators. For instance, the monitoring components may monitor various performance characteristics such as input date rate, output data rate, buffer fill etc. The control system may then identify various system performance conditions, such as load imbalances, input data overloads, low output data rates, sub-unit faults etc. that may indicate that the processing system should be re-configured. The control system may then update the deployment of the data processing sub-units to account for the identified performance defects.

The control system may update the processing system by scaling the data processing sub-units to account for the identified performance issues. For instance, additional instances of data processing sub-units may be deployed to increase the resources available for a given processing operation. The control system may also update the interconnection of the operators to ensure that data is routed to the newly deployed data processing sub-unit instance(s).

In some embodiments, the control system may be configured to automatically update the configuration of the data processing system in response to monitored system conditions and/or application requirements. Alternatively, modifications to the data stream processing system may be initiated by an administrator in response to prompts from the control system.

In some embodiments, some of the operators and/or data processing sub-units may be configured to transmit data using the User Datagram Protocol (UDP). This may ensure that data is transmitted between data processing sub-units rapidly. UDP may also allow the processing system to be updated on the fly, without requiring additional overhead in establishing communication links. This may allow operators to redirect data streams to new and/or different data processing sub-units while the system remains operational.

Referring now to FIG. 1, there is provided is a block diagram of an data processing computer network system 100 in accordance with an example embodiment. System 100 is an example of a data processing system that may be used to monitor and analyze a communication network.

Computer network system 100 generally includes a plurality of computers connected via one or more data communication networks, which may be connected to the Internet. In general, however, the computer network system includes a data stream processing system 105, at least one data source 110, and at least one data output application 120 connected via the network. Optionally, one or more of the data output applications 120 may be implemented as a data evaluation application, such as a data analysis application or data monitoring application. Alternately or in addition, one or more of the data output applications 120 may be implemented as a data storage application.

In some cases, the connection between network and the Internet may be made via a firewall server (not shown). In some cases, there may be multiple links or firewalls, or both, between the network and the Internet. System 100 may also be implemented using multiple networks or virtual networks, which can be internetworked or isolated. These have been omitted for ease of illustration, however it will be understood that the teachings herein can be applied to such systems. The networks may be constructed from one or more computer network technologies, such as IEEE 802.3 (Ethernet), IEEE 802.11 and similar technologies.

As shown in FIG. 1, system 100 includes a plurality of data sources 110a-110n. Each data source 110a-110n can be configured to provide a corresponding stream 111a-111n of data. The data sources 110a-110n may include various different types of data, such as network flow data (NetFlow, IPFix, sFlow, Bro Flows, etc.), syslog event data, DNS request logs, host event logs, collected threat information, and data from network probes, Internet of Things applications, and other data generating devices.

The system 100 also includes a data stream processing system 105. The data stream processing system 105 can receive the plurality of data streams 111 from the plurality of data sources 110. The data stream processing system 105 can be configured to process the received data streams to generate output data streams 121a-121m. Each output data stream 121a-121m can be provided to an analysis/monitoring application coupled to the data stream processing system 105, such as applications 120a-120m. Alternately or in addition, an output data stream 121a-121m can be provided to a data storage application coupled to the data stream processing system 105.

The applications 120 can include one or more applications configured to detect network characteristics such as events of interest in the received data. Examples of events of interest can include faults, anomalies, and intrusions/attacks in the network being monitored. The applications 120 may also be configured to identify and learn about other network characteristics such as patterns of demand, usage, and attacks on the network(s) being monitored.

The applications 120 can also include data storage applications. The data storage applications can be configured to perform real-time storage of the some, all, or selected portions of the data streams 111. In some cases, an application 120 may integrate both data analysis and data storage functionality.

The applications 120 may provide network monitoring feedback on the identified network characteristics, such as identifying an event of interest (e.g. faults, anomalies, and intrusions) and/or identifying patterns of behavior, demand, usage, and attacks. The network monitoring feedback can include a prompt or prompts for administrator intervention.

In order to detect events of interest, the applications 120 may require the data streams 111 to be pre-processed. The data stream processing system 105 can be configured to process/manipulate the received data streams 111 to generate the processed data required by the applications 120. Examples of processing operations performed by the data stream processing system 105 can include data streams being parsed, filtered, matched, enriched, transformed (e.g. compressed and/or expanded), and extracting features for example. The processed data streams 121 can then be analyzed by the applications 120. Alternately or in addition, the processed data streams 121 may be stored by the applications 120 (e.g. in non-volatile storage memory). The stored processed data streams may subsequently be accessed/retrieved for evaluation (e.g. fault analysis, auditing etc.).

Each incoming data stream 111 can arrive at a data collection input, or ingress interface, of the data stream processing system 105. Each incoming data stream may include blocks of data encapsulated in a variety of protocols, such as UDP, TCP, SCTP, Protocol Buffers, Apache Thrift, and AMQP for example. The data stream processing system 105 can include a plurality of data processing sub-units that perform various functions, such as parsing, filtering, matching, enriching, transforming (e.g. compressing, expanding etc.), anonymizing, etc. in order to extract data required by the applications 120. The data stream processing system 105 can then output a stream 121 of extracted data to each application 120.

The incoming data streams 111 coupled to the data stream processing system 105 may contain the information required for a variety of different analysis applications. However, the specific format and/or content of the data required by the individual applications 120 may vary. Accordingly, the data stream processing system 105 can define a plurality of processing sequences (or sub-graphs) for the applications 120. The data stream processing system 105 may be defined to perform simultaneous extraction/processing of data required by a plurality of applications 120.

In some cases, the data stream processing system 105 may define separate, or at least partially separate, data processing sequences/sub-graphs for each application 120. Alternatively, there may be cases where two or more applications 120 require the same data, or at least some of the same data. Accordingly, the data stream processing system 105 may define at least partially overlapping processing sequences for the applications 120 requiring overlapping data. Optionally, the data analysis applications may each include corresponding data storage applications to ensure that the data required for each analysis application is stored for later access and retrieval. The corresponding data storage applications may be connected to the same output data stream and/or a duplicated output data stream as the corresponding data analysis application. In some cases, only a subset of data analysis applications or data output streams may be coupled to a data storage application.

In some embodiments, the data stream processing system 105 may be dynamically reconfigurable. That is, the data stream processing system 105 may be configured to adapt to changes in the incoming data streams 111 and/or changes in application requirements. The data stream processing system 105 may be configured to dynamically update the processing graph defined therein to account for the changes in network operations and/or monitoring requirements.

The components of system 100 may be implemented using a combination of hardware and software. In system 100, computers and computing devices may be connected to a network or a portion thereof via suitable network interfaces. The components of system 100, such as the data sources 110, data stream processing system 105 and applications 120 may be implemented using computers, such as laptop, desktop, and/or server computers. These computers may connect to a network and one another via a wired Ethernet connection or a wireless connection. The components of system 100 may also connect via the Internet.

In general, the components of system 100 may be implemented using one or more computers, each having a processor, volatile memory and non-volatile storage memory, at least one network interface. In some cases, the computers may also include input devices such as a keyboard and trackpad, output devices such as a display and speakers, and various other input/output devices where those devices may be operated by a user or administrator.

Data stream processing system 105 can be provided by one or more computer or computer servers. Data stream processing system 105 includes at least one processor, volatile and non-volatile memory, at least one network interface, and may have various other input/output devices. As shown, data stream processing system 105 is linked to data sources 110 using a network. In some cases, the data stream processing system 105 may be linked to the data sources 110 using a local network or closed network. However, in other embodiments, the data sources 110 and/or data stream processing system 105 may be linked via the Internet.

In some embodiments, the data stream processing system 105 may be provided using virtual machines and/or containers corresponding the resources required for a given implementation. Example configurations of the data stream processing system 105 are described in greater detail with reference to FIGS. 2A and 2B below.

As used herein, the term "software application" or "application" refers to computer-executable instructions, particularly computer-executable instructions stored in a non-transitory medium, such as a non-volatile memory, and executed by one or more computer processors. The computer processor(s), when executing the instructions, may receive inputs and transmit outputs to any of a variety of input or output devices to which it is coupled.

The software application may be associated with an application identifier that uniquely identifies that software application. In some cases, the application identifier may also identify the version and build of the software application. Within an organization, a software application may be recognized by a name by both the people who use it, and those that supply or maintain it.

A software application can be, for example, a monolithic software application, built in-house by the organization and possibly running on custom hardware; a set of interconnected modular subsystems running on similar or diverse hardware; a software-as-a-service application operated remotely by a third party; third party software running on outsourced infrastructure, etc. In some cases, data stream processing system 105 may be provided as a software application that can be integrated into a computer network system such as system 100. Alternatively, the data stream processing system 105 may be implemented as a remote or cloud-based processing system that is in communication with a network to be monitored.

It will be understood by those of skill in the art that references herein to data stream processing system 105 (or components thereof) as carrying out a function or acting in a particular way imply that a processor or processors is/are executing instructions (e.g., a software program) stored in memory and possibly transmitting or receiving inputs and outputs via one or more interface. The memory may also store data input to, or output from, processor in the course of executing the computer-executable instructions.

In some embodiments, the data stream processing system 105 may also include, or be linked to, an administrator computer. For example, the data stream processing system 105 may be directly linked to an administrator computer, for example, via a Universal Serial Bus, Bluetooth™ or Ethernet connection. Alternatively, data stream processing system 105 may be linked to the administrator computer via a local network or, in some cases, the Internet. In some other cases, the administrator computer and data stream processing system 105 may be integrated or co-located. The administrator computer may allow an administrator of the system 100 to monitor the system 100 and to manually update the data sources 110, applications 120 and configuration of the data stream processing system 105. In some cases, the administrator computer may be omitted, for instance where the data stream processing system 105 is configured to operate autonomously.

The administrator computer can include a processor, a display, a memory, a communication interface and a database. The administrator computer may be provided as a desktop computer, laptop computer, or mobile device such as a smartphone or tablet that is operable to communicate with the data stream processing system.

The processor of the administrator computer is a computer processor, such as a general purpose microprocessor. In some other cases, processor may be a field programmable gate array, application specific integrated circuit, microcontroller, or other suitable computer processor.

The processor is coupled to the display, which is a suitable display for outputting information and data as needed by various computer programs. In particular, display may display a graphical user interface (GUI). The administrator computer may execute an operating system, such as Microsoft Windows™ GNU/Linux, or other suitable operating system.

The processor is coupled, via a computer data bus, to the memory. Memory may include both volatile and non-volatile memory. Non-volatile memory stores computer programs consisting of computer-executable instructions, which may be loaded into volatile memory for execution by processor as needed.

The memory on the administrator computer may store a software application referred to herein as a system-monitoring dashboard. The system-monitoring dashboard may be configured to monitor the operation of data stream processing system 105, and to enable an administrator to make modifications to the data stream processing system 105.

The system 100 may also communicate detected events of interest or identified patterns to the administrator computer. The system-monitoring dashboard may provide graphical user interfaces to allow an administrator to review the identified events and/or patterns. The system-monitoring dashboard may allow the administrator to implement mitigating actions in response to the feedback from the system 100.

In some cases, automated network protection responses may be performed directly by data processing system 100 without requiring communication to the administrator computer.

Figure 2A:
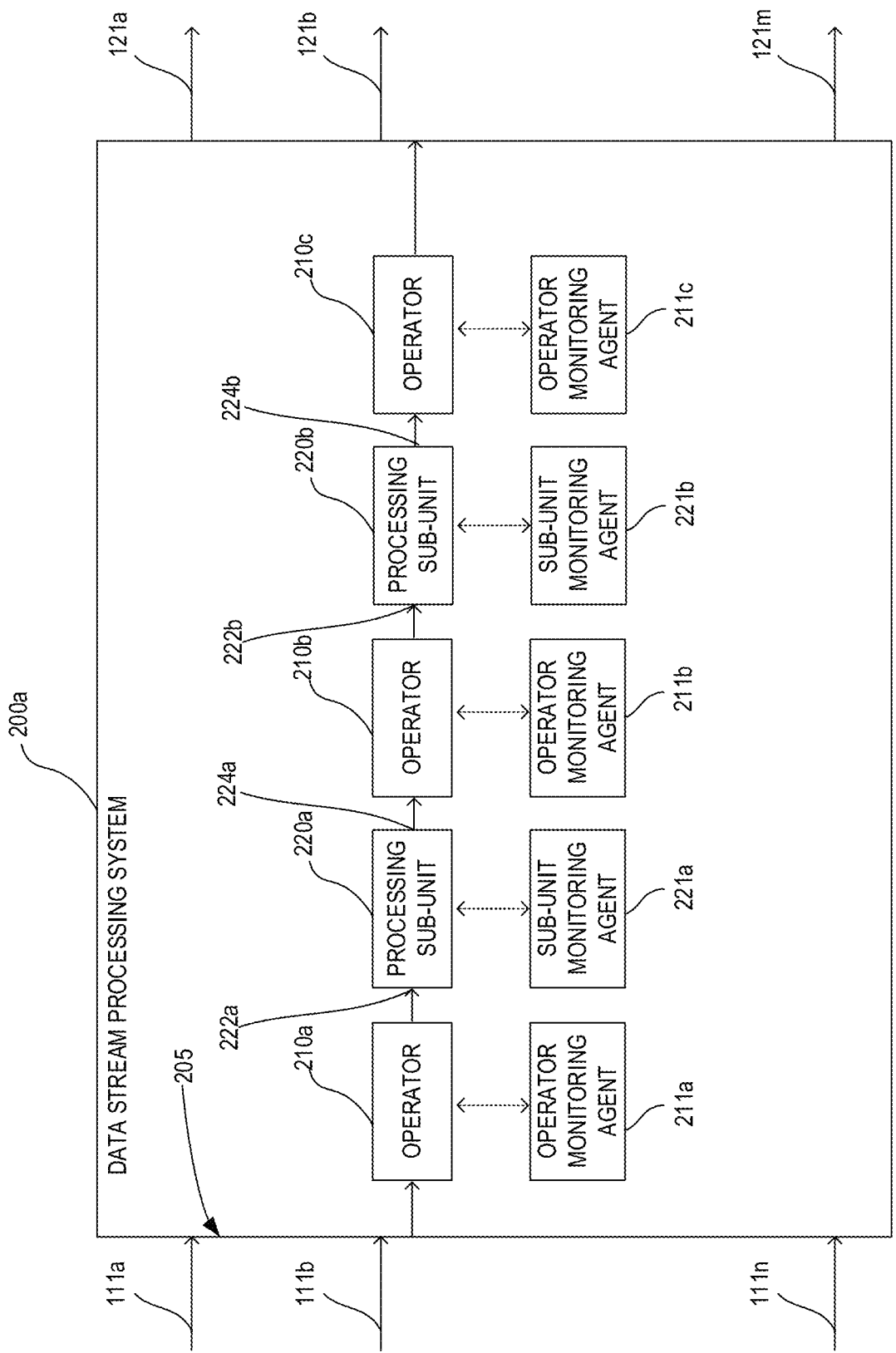
FIG. 2A is a block diagram of a data stream processing system in accordance with an example embodiment.

Referring now to FIG. 2A, there is shown a block diagram of a data stream processing system 200a in accordance with an example embodiment. In some embodiments, data stream processing system 200a may be used to provide the data stream processing system 105 shown in FIG. 1.

Data stream processing system 200a is an example of a processing system in which incoming data streams 111 are connected to processed data stream outputs 121 through a plurality of processing components that are interconnected in a feed-forward graph structure. FIG. 2A illustrates a simplified example that includes only two data processing sub-units 220a and 220b.

As shown in FIG. 1, the data stream processing system 200a can include a data collection input 205. The data collection input 205 can be connected to at least one incoming data stream 111. As shown in FIG. 2a, the data collection input 205 is connected to a plurality of incoming data streams 111a-111n. As explained above, the incoming data streams 111 may include various types of data, such as network flow data (NetFlow, IPFix, sFlow, Bro Flows, etc.), syslog event data, DNS request logs, host event logs, collected threat information, and data from network probes, Internet of Things applications, and other data generating devices. The incoming data streams 111a-111n may provide data using various different communication protocols.

The data stream processing system 200a can also include a plurality of data processing sub-units 220. In FIG. 2A, only two data processing sub-units 220a and 220b are shown, although it should be apparent that many more data processing sub-units 220 may be included in embodiments of data stream processing system 200a.

Each data processing sub-unit 220 can be preceded by, and followed by, a data operator 210 (i.e. each data processing sub-unit is connected to at least one upstream data operator and at least one downstream data operator). In some cases, each data processing sub-unit 220 may be directly connected to one or both of the upstream and downstream operator. However, in some cases a sequence of two or more data processing sub-units 220 may be directly connected without requiring an intervening operator 210 (see e.g. FIG. 6A).

Each data processing sub-unit 220 has a data input 222 and a data output 224. The data processing sub-unit 220 receives an input data stream at its data input 222. The data processing sub-unit 220 can then produce an output data stream by manipulating and modifying the data in the input data stream. The output data stream, including the modified data, can then be output from the data output 224.

Data processing sub-units 220 may be configured to modify data from the input data stream in different ways. In some cases, a data processing sub-unit 220 may be configured to generate the output data stream as a direct modification of the input data stream, e.g. by parsing, matching, filtering, subsampling, enriching, anonymizing, reformatting, matching, transforming (e.g. compressing, expanding) etc. the input data stream. These modifications may include inserting additional data into the input data stream. In some cases, a data processing sub-unit 220 may be configured to generate the output data stream by modifying the input data stream to extract additional information therefrom, for instance by transforming the input data stream via feature extraction, classification, or detection techniques for example.

The data processing sub-units 220 may be implemented as software, hardware or a combination of both. For instance, the data processing sub-units 220 may be implemented as software components running on containers, virtual machines, or directly on hardware (i.e. bare metal).

In some embodiments, the data processing sub-units 220 may be implemented using high performance languages such as C/C++. This may provide system 200a with reduced delays and allow for improved performance. In other embodiments, the data processing sub-units 220 may be implemented using programmable or special purpose hardware. The implementation of the data processing sub-units 220 may depend on the requirements of a given system, such as throughput and performance requirements.

The data stream processing system 200a also includes a plurality of operators 210. The plurality of operators 210 can connect the data collection input 205, the plurality of data processing sub-units 220 and one or more data output units, such as data analysis applications and/or data storage applications (not shown in FIG. 2A). The operators 210 can direct the flow of data into and out of each data processing sub-unit 220. In directing the flow of data, the operators 210 can leave intact the informational content of the data that is being passed through. The operators 210 can also provide the required connectivity between data processing sub-units, for instance, by modifying the communication protocol used to transmit data.

The plurality of operators 210 and data processing sub-units 220 can be arranged into a directed acyclic graph in which data flows from the data collection input 205 through the plurality of data processing sub-units 220 and to the data output units (e.g. data analysis applications and/or data storage applications) via the plurality of operators 210. Data can be provided to the data output units (e.g. data analysis applications and/or data storage applications) as a processed output data stream.

Various different types of operators may be used in system 200a. In general, the operators may be grouped into two types of operators, compositional operators and connectivity operators.

Compositional operators may be used to direct, and re-direct, the flow of data between different data processing sub-units 220. Some examples of compositional operators are shown in FIGS. 3A-3D described herein below. In some embodiments, variants of the compositional operators may be provided that operate using different communication formats and/or protocols.

Connectivity operators may be used to provide required communication connectivity between subsequent data processing sub-units 220. That is, the connectivity operators may provide translation operations that modify the format and/or protocol that is used to transmit the data between subsequent data processing sub-units 220. Some examples of connectivity operators are shown in FIGS. 4A-4E described herein below.

In some cases, operators may be configured to provide both compositional and connectivity functions.

Data stream processing system 200a provides a simplified example of a directed acyclic graph that includes a plurality of operators 210 and data processing sub-units 220. As shown in FIG. 2A, data flows from the data input 205 and into data processing sub-units 220a via operator 210a. The output data stream from data processing sub-unit 220a then flows to data processing sub-unit 220b via operator 210b.

In general, the plurality of incoming data streams 111 can be connected to one or more outgoing processed data streams 121 through a plurality of data processing sub-units 220 using operators 210. FIG. 2A illustrates a simplified example with a direct sequence of two processing sub-units 220a and 220b. In general, however, there may be various different branching processing subgraphs or completely independent processing sequences/subgraphs downstream from the data input 205. The totality of the processing sequences/subgraphs can be arranged as a directed acyclic graph (i.e. a feedforward graph).

The specific processing subgraphs/processing paths from the input 205 to a particular output stream 121 can be defined to include the plurality of data processing sub-units 220 that operate in conjunction to extract the information required for the application connected to that output stream 121. In some cases, the processing subgraphs for two or more applications may at least partially overlap, for instance where at least some of the same processing steps are required for those applications (see e.g. FIG. 7C).

The data stream processing system 200a can be configured so that at least some of the data processing sub-units 220 (and, accordingly, some of the operators 210) can transmit data using the User Datagram Protocol (UDP). The data outputs of these data processing sub-units 220 can be directly connected to a sub-unit operator that receives data using UDP. Similarly, at least some of the data processing sub-units 220 may receive data using UDP. The data inputs of these data processing sub-units 220 can be directly connected to a sub-unit input operator that transmits data using UDP.

In some cases, for at least some of the data processing sub-units 220 the data input 222 of each of those data processing sub-units 220 can be directly connected to an upstream operator 210 that transmits data using the User Datagram Protocol (UDP) and the data output of each of those data processing sub-units 220 can also be directly connected to a downstream operator 210 that transmits data using UDP.

Configuring components of the data stream processing system 200a to transmit data using UDP may provide the system 200a with low-latency communications. The operators 210 and data processing sub-units 220 communicating using UDP may avoid bottlenecks that might otherwise be caused by the use of communication protocols that require initial handshake routines or messaging overhead to transmit messages.

The operators 210 can provide loose couplings between the plurality of data processing sub-units 220 in system 200a. This may allow the data processing sequences and subgraphs to be updated while the system is operational. The plurality of operators 210 may be dynamically reconfigurable to adapt to changes in the operation and/or requirements of system 200a. That is, the operators 210 may change the downstream data processing sub-unit 220 to which they direct data while data is flowing therethrough.

In embodiments of system 200a, the data processing sub-units 220 and/or operators 210 may be scalable. That is, additional instances of data processing sub-units 220 may be added (or removed) from the system 200a. Instances of data processing sub-units 220 may be added/removed to account for changes in the system 200a, such as increases or decreases in the data rate from one or more incoming data streams 111 and/or changes to the applications being served.

Redirecting, or adjusting the direction of data flow, while the system 200a is operational may facilitate real-time scaling of system 200a. In response to determining that an additional instance of a data processing sub-unit is required, a new data processing sub-unit 220 can be deployed. The data processing sub-unit can be coupled to a downstream operator that is configured to receive data from that data processing sub-unit. Once the data processing sub-unit 220 is deployed, the upstream operator 210 can re-direct some or all of the data flowing therethrough to the newly deployed data processing sub-unit. In some cases, the flow of data may be re-directed to balance the data load between different data processing sub-units, including any newly deployed data processing sub-units 220.

In some cases, redirecting the flow of data may include changing the direction of data flow from one data processing sub-unit 220 to another data processing sub-unit. This may occur, for instance, where the data processing sub-unit is being replaced with an instance of an updated data processing sub-unit or a different data processing sub-unit. Following deployment of the new data processing sub-unit, the upstream operator 210 can dynamically stop transmitting data to the old instance and begin transmitting to the newly deployed instance.

The operators 210 may be configured to transmit data using various communication protocols. For instance, some of the operators 210 can be configured to transmit data using UDP. This may facilitate dynamic re-direction of the data flow, as UDP does not require (i.e. may omit) any handshaking operations prior to initiating communication. The UDP output stream of an operator 210 can be redirected to a new or different data processing sub-unit 220 without interrupting data transmission or requiring an initial handshaking protocol—in other words, the UDP output stream of an operator 210 can be redirected to a new or different data processing sub-unit 220 while data transmission is ongoing and/or omitting an initial handshaking protocol.

In some embodiments, one or more operators 210 may use TCP to communicate with downstream operators 210 and/or processing sub-units 220. This may ensure reliable data transfer while avoiding/minimizing deletions, errors and insertions. Operators 210 that use TCP can be configured to transmit streams of data bytes, although the boundaries between block of data bytes (e.g. data files) may not be identified in the TCP stream. In some cases, the use of TCP may be limited to data transmission between remote servers.

In some embodiments, one or more operators 210 may use pipe-based communication protocols. Pipes define a method for interprocess communication that is arranged in a First-In-First-Out (FIFO) configuration. An operator 210 can write output data to a first, write, end of the pipe and the data at the first end of the pipe can be buffered until it is read by the downstream operator 210 or processing sub-unit 220 that is coupled to the second, read, end of the pipe.

As shown in FIG. 2A, each of the operators 210 and data processing sub-units 220 can be connected to a corresponding monitoring agent 211/221. In system 200*a*, there is a one-to-one relationship between the monitoring agents 211/221 and the operators 210 and data processing sub-units 220. Alternatively, a monitoring agent may be configured to monitor multiple operators 210 and/or data processing sub-units 220. For instance, an individual monitoring agent may be configured to monitor a set of parallel data processing sub-unit instances that each correspond to the same data processing sub-unit operation.

The monitoring agents 211/221 can monitor the performance of the operator 210 or data processing sub-unit 220 to which it is connected. For instance, the monitoring agent may monitor the resource utilization and/or performance of a given data processing sub-unit, such as CPU utilization, memory utilization, service rate, buffer fill and packet/message loss for example. The performance data gathered by the monitoring agents 211/221 can be used to determine whether, and how, the components or connections of system 200*a* should be updated. For instance, where a monitoring agent 221 determines that the performance of one of the data processing sub-units 220 is poor (e.g. there is very high resource utilization, very high buffer fill, high pack loss, low throughput etc.), it may be necessary to replace that data processing sub-unit 220 and/or add an additional instance of that data processing sub-unit to account for the performance defect. For instance, the monitoring agents 211/221 may generate alarm signals when performance thresholds are met or exceeded.

The data processing system 200*a* can also include a central control component. An example of a central control component is described in further detail below with reference to FIG. 5A. The central control component can be connected to the monitoring agents 211/221. Each monitoring agent 211/221 can transmit monitoring data to the central controller.

The monitoring agents 211/221 may transmit monitoring data to the central controller on an ongoing or continual basis. This may provide the central controller with an ongoing overview of system operations. In some cases, the monitoring agents 211/221 may transmit monitoring data to the central controller in response to queries from the central controller. For instance, the controller may poll the monitoring agents 211/221 on a periodic basis to provide a periodic status update on the operations of system 200*a*. The monitoring agents 211/221 can also transmit alarm messages to the controller.

The controller may update system 200*a* in response to the monitoring data from the agents 211/221. For instance, the controller may add/remove data processing sub-units 220 and/or update operators 210 to adjust the connections between data processing sub-units 220.

In some embodiments, the controller may update the system 200*a* automatically to account for deviations from the required performance. Alternatively, the controller may generate prompts for an administrator user to update the system 200*a*. In some cases, the controller may identify potential updates to be approved or denied by an administrator user.

In some embodiments, some or all of the data processing sub-units 220 may include a data buffer at the data input 222. The size of the data buffer may be configured based on the data rate expected for system 200*a*. For implementations in which the data rate is expected to be relatively constant or steady, the data buffer size may be reduced. The required buffer size may depend on the throughput as well as the "burstiness" of data arriving at a given data processing sub-unit. Higher throughput and burstiness may require larger buffer size to accommodate surges in arrivals.

The controller may monitor the buffer usage of each of those data buffers (e.g. using monitoring agents 221). Based on the monitored buffer usage the controller may modify the acyclic graph defined by system 200*a* to improve system operations and/or resource utilization.

In some embodiments, a variable buffer size may be used for some data processing sub-units 220. The buffer size may be adjustable by the controller in response to determining the buffer usage is increasing at a threshold rate and/or has reached a fill threshold. Additionally or alternatively, the controller may monitor the buffer usage to determine that the processing graph should be modified. In some such instances, the buffer sizes may be static.

In some cases, one or more usage thresholds may be defined for the buffers of the data processing sub-units 220. The controller may update the acyclic graph defined by system 200*a* in response to determining that the buffer for one of the data processing sub-units 220 has reached that usage threshold.

For example, in some cases a usage threshold may be defined as a certain percentage of buffer fill (e.g. 80% or 90%). When the monitored buffer usage for a given data processing sub-unit reaches the usage threshold, the controller may determine that an additional instance of that data processing sub-unit is required. The controller may then modify the acyclic graph by adding an additional instance of that data processing sub-unit. The controller may then update the upstream operator(s) to redirect at least some data through the newly added data processing sub-unit instance.

In other cases, a usage threshold may be defined based on a change in buffer usage for a given data processing sub-unit. For instance, where the controller determines that the buffer usage of a given data processing sub-unit has increased by a defined rate, the controller may again determine that an additional instance of that data processing sub-unit is required and update the processing graph accordingly.

Figure 2B:
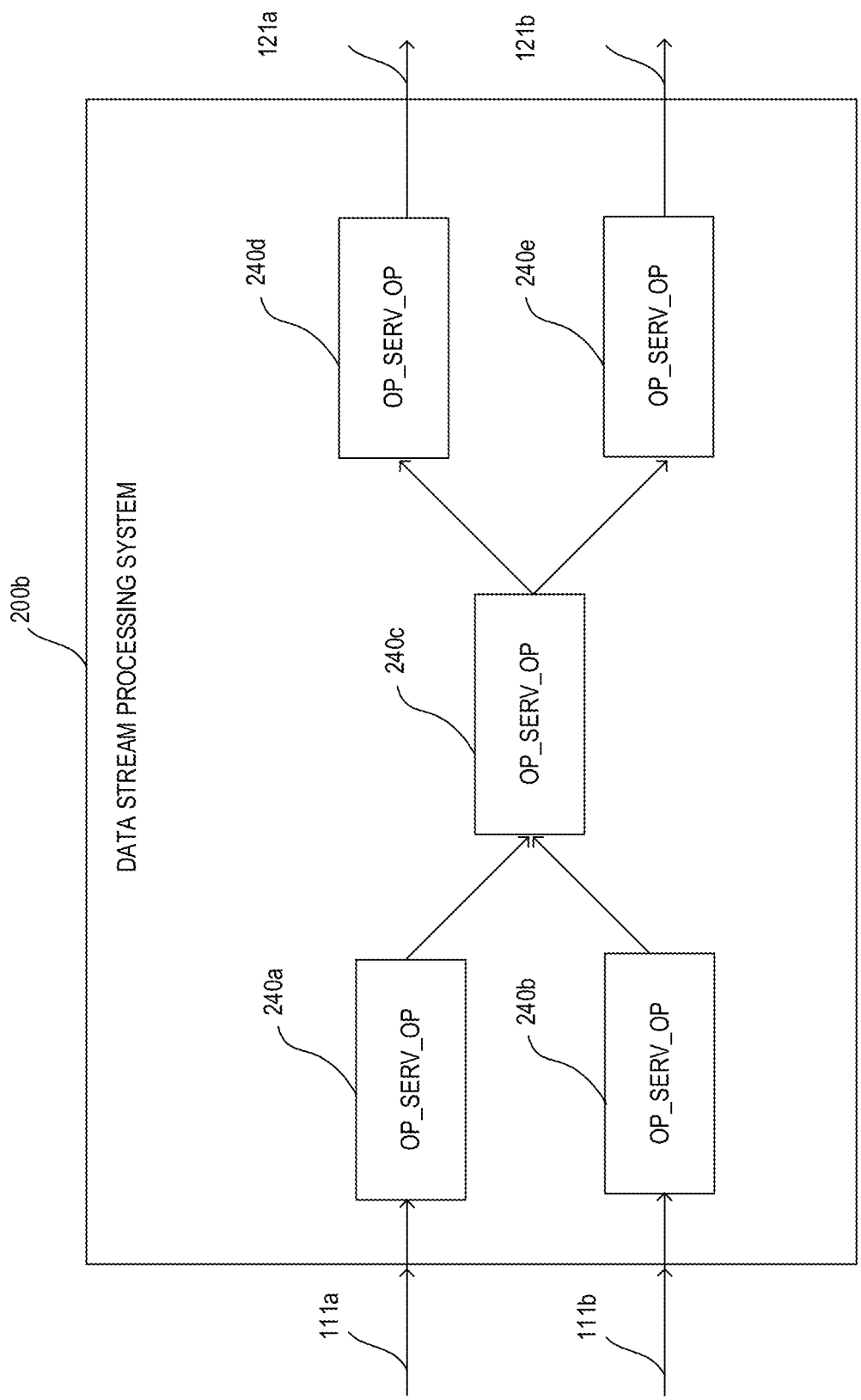
FIG. 2B is a block diagram of another data stream processing system in accordance with an example embodiment.

Referring now to FIG. 2B, shown therein is a block diagram showing another example embodiment of a data stream processing system 200b. In some embodiments, data stream processing system 200b may be used to provide the data stream processing system 105 shown in FIG. 1.

Data stream processing system 200b is an example of a processing system in which the processing graph is defined as a plurality of data processing segments 240a-240e (also referred to as a processing block or service block). The deployment and operation of individual elements within data processing system 200a may be generally implemented in a manner analogous to system 200a. In system 200b, each of the data processing segments 240 includes an input operator, one or more data processing sub-units connected in a sequence, and a sequence output operator. The upstream end of the sequence of data processing sub-units can be connected to the input operator and the downstream end of the sequence of data processing sub-units can be connected to the output operator.

Configuring the data stream processing system 200b using a plurality of data processing segments 240 can simplify management of system 200b. Each data processing segment 240 can be associated with one or more processing tasks. When a set of processing tasks need to be performed for downstream applications, the data processing segment 240 that performs some or all of the processing tasks in that set can be added to the system 200b as a unit. Similarly, where further processing bandwidth is required, an additional data processing segment can be added in parallel to increase the volume of data that can undergo the particular processing tasks in a given time period.

Additionally, the input operators and output operators in the data processing segments 240 can be configured to provide connectivity with minimal initialization required. For instance, the input operators and output operators may be configured to communicate using UDP so that data processing segments 240 can be inserted into a data stream processing system 200b and begin communicating without any initial handshaking required.

As shown in the example of FIG. 2B, the stream processing system 200b is connected to two separate incoming data streams, 111a and 111b. The data from the first incoming data stream 111a can be routed to data processing block 240a while the second incoming data stream 111b can be routed to data processing block 240b. In some cases, the data processing blocks 240a and 240b may perform different processing operations on the data streams 111a and 111b respectively. For instance, the format or content of the data in streams 111a and 111b may be different and may thus require different processing to be performed.

In some embodiments, the stream processing system 200b may include a plurality of parallel data processing segments. Each parallel data processing segment in the plurality of parallel data processing segments can include an instance of the same sequence input operator, an instance of the same data processing sequence, and an instance of the same sequence output operator.

For example, data processing segments 240a and 240b may each include the same sequence of input operator, one or more data processing sub-units, and output operator. The data processing segments 240a and 240b may thus provide the same processing functionality as one another. This may allow throughput of system 200b to be managed and potentially increased by increasing the volume of data that can be processed concurrently. Providing processing blocks in parallel can allow scaling of operators as well as processing data units.

As shown in FIG. 2B, the output data stream from processing blocks 240a and 240b can be routed to processing block 240c. The processing block 240c can perform a defined sequence of operations on the data received from both processing blocks 240a and 240b.

In some embodiments, the data processing sub-units within the data processing blocks, such as data processing block 240c, may include a plurality of parallel sub-unit instances. Each parallel sub-unit instance can be configured to modify the data in the received data stream in the same manner. Additionally, each of the parallel sub-unit instances can be connected to the same preceding data processing sub-unit.

One or more distributive compositional operators can be connected to, and upstream from, the parallel sub-unit instances. Distributive operators may distribute the outgoing data stream (i.e. the data streams received from processing blocks 240a and 240b) between the parallel processing sub-units. Examples of distributive operators can include load-balancing operators and conditional operators such as those shown in FIGS. 3B and 3C described herein below.

Once data has been modified by the data processing block 240c, the outgoing data stream can be directed to processing blocks 240d and 240e. The data processing block 240c may include a distributive and/or duplicative compositional operator usable to route data to the processing blocks 240d and 240e.

For instance, in some cases the outgoing data stream may be selectively distributed to one or both of processing blocks 240d and 240e. In other cases, the outgoing data stream may be duplicated and sent to both processing blocks 240d and 240e.

In the example shown in FIG. 2B, the processing blocks 240d and 240e are connected to separate outgoing data streams 121a and 121b. Each of the outgoing data streams 121a and 121b can be connected to a data output unit such as monitoring and/or analysis applications and/or data storage applications. The monitoring and/or analysis applications can be configured to operate on the processed data in the data streams 121a and 121b to identify events of interest from the incoming data streams 111a and 111b. The data storage applications can be configured to store the processed data in the data streams 121a and 121b in non-volatile storage memory. The data storage applications may store the processed data for later retrieval and/or analysis. The processed data may be stored with time index data determined by the preceding processing blocks (e.g. time index data may be inserted into headers of processed data items). The time index data may reflect the time at which each data item was generated and/or received by the system 200b. This may facilitate later analysis, by permitting a sequence of the stored processed data to be determined.

In some cases, each output data stream 121*a* and 121*b* can include data from one or both of the input data streams 111*a* and 111*b*. In some examples, output data stream 121*a* may receive processed data from only one of the input data streams 111*a* and 111*b*, while output data stream 121*b* receives processing data from the other input data stream.

Alternatively, the processed data that is routed to the output data stream 121*a* or the output data stream 121*b* may depend on the informational content of the data stream received from the input data streams 111*a* and 111*b*. For instance, the processing block 240*c* may include compositional operators configured to control the data that is directed to the processing blocks 240*d* and 240*e*, and in turn output data streams 121*a* and 121*b*.

As shown, the separate output data streams 121*a* and 121*b* can share at least one processing segment 240*c*. This may be the case even where the output data streams 121*a* and 121*b* receive processed data corresponding to entirely different input streams 111 or entirely different informational content. For instance, the downstream output unit (e.g. monitoring applications) connected to output streams 121*a* and 121*b* may require some of the same processing operations to be performed (e.g. the same enrichment data added or the same file format of data). By sharing a processing segment 240*c*, the size and resource utilization of system 200*b* may be reduced.

Figure 2C:
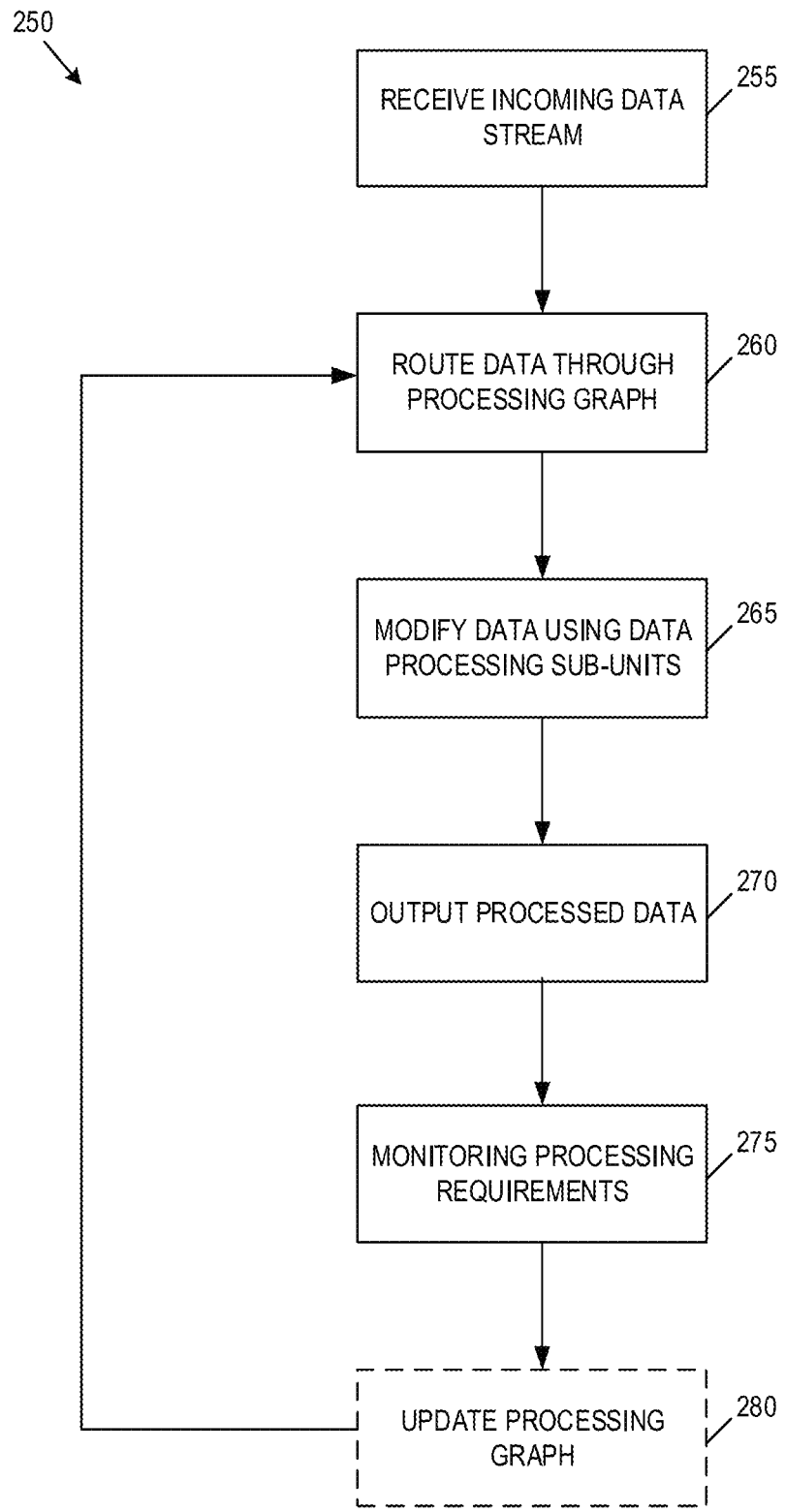
FIG. 2C is a flowchart illustrating a method of processing streaming data in accordance with an example embodiment.

Referring now to FIG. 2C, shown therein is a flowchart illustrating a method or process 250 of processing streaming data. Method 250 may be carried out by various components of system 100 such as the data stream processing system 105 and data stream processing systems 200*a* and 200*b*.

At 255, at least one incoming data stream can be received. Each incoming data stream can be received from a data source that provides data relevant to a system or network that is being monitored. For example, the incoming data streams can include various different types of data such as network flow data (NetFlow, IPFix, sFlow, Bro Flows, etc.), syslog event data, DNS request logs, host event logs, collected threat information, and data from network probes, Internet of Things applications, and other data generating devices.

At 260, the data from each incoming data stream can be routed through a data processing graph. The data processing graph can be defined to include a plurality of data processing sub-units and a plurality of operators that connect the data processing sub-units. The operators can be arranged to define the route through the data processing graph for each receiving data stream.

The processing graph can be defined as a feedforward or directed acyclic graph. The data received from the incoming data streams can be routed unidirectionally towards one or more processed data outputs. Each processed data output can be connected to a data output unit. Each data output unit may include a data analysis application and/or data storage application. The data from the incoming data streams can be routed through the processing graph to one or more of the downstream data output applications (e.g. data processing applications and/or data storage applications) to provide those applications with the required pre-processed data.

The operators used to define the processing graph can be configured to direct data streams to the various processing sub-units. Some of the operators can be configured to transmit and/or receive data using the User Datagram Protocol (UDP). Similarly, some of the data processing sub-units can be configured to transmit and/or receive data using UDP. This may facilitate on-the-fly changes to the data processing graph. This may also provide high throughput data transmission, as communication initialization procedures may be avoided.

At 265, the data in the data streams can be modified by the data processing sub-unit. Each data processing sub-unit can receive an incoming stream of data and perform one or more operations on the received data. The data processing sub-unit can then output a modified data stream that results from the operations performed.

As data is routed through the processing graph, it may be directed through multiple data processing sub-units. As a result, multiple processing operations may be performed on the data in each data stream. The particular types and sequence of data processing units (and corresponding data processing operations) may vary depending on the requirements of the downstream data output units (e.g. data analysis applications and/or data storage applications).

At 270, the data stream processing system can output one or more processed data streams. The processed data streams correspond to the incoming data streams after having been modified by the processing sub-units through which they have been routed.

At 275, a controller can monitor the processing requirements of the data processing graph. For example, the controller may monitor the applications that are currently coupled to the data processing graph. By monitoring the applications that are currently coupled to the data processing graph, the controller may identify the necessary data processing steps that need to be performed by the data processing graph based on the type of processed data required by those applications in order to operate.

The controller can also identify changes in the processing requirements, for instance as the result of changes to the applications connected to the processing graph or changes to the data sources. The controller may receive a request for a new processing application to be deployed. The controller may then determine that modifications to the processing graph may be required in order to route data receive at 255 through the processing sub-units necessary for the new application.

The controller may also determine that modifications to the processing graph may occur when an application is removed or no longer connected to the data stream processing system.

The controller can also monitor the current status of the various operators and processing sub-units in the processing graph. The controller can identify various performance deficiencies in the operators and/or processing sub-units that may indicate that updates to the data processing graph may be required.

For instance, the controller can monitor performance characteristics of each of the data processing sub-units. Sub-unit performance characteristics can include characteristics such as the input date rate, output data rate, buffer fill etc. The controller may identify a performance deficiency or performance issue in one or more data processing sub-units, such as load imbalances, input data overloads, low output data rates, sub-unit faults etc.

The controller may similarly monitor the performance characteristics of each of the operators in the processing graph. The controller may identify a performance deficiency or performance issue in one or more operators in a manner analogous to the data processing sub-units.

At 280, the controller can update the data processing graph. The controller may update the data processing graph in response to monitoring the processing graph performance at 275. The data stream processing system may then continue to route data through the processing graph at 260. Examples processes for updating the data processing graph are shown in FIGS. 5B and 5C and described in further detail herein below.

Updating the data processing graph may involve adding and/or removing data processing sub-units and/or operators. In some cases, the controller may update the processing system by scaling the data processing sub-units to account for performance issues identified at 275. Additional instances of data processing sub-units may be deployed to increase the resources available for a given processing operation. The control system may also update the interconnection of the operators to ensure that data is routed to the newly deployed data processing sub-unit instance.

For example, where the buffer fill of a given data processing sub-unit is determined to exceed a usage threshold, the controller may deploy an additional instance of that data processing sub-unit. The data processing graph may then be updated to re-route some data through the newly deployed data processing sub-unit to alleviate the strain on the existing data processing sub-unit.

In other cases, the controller may determine that new or different processing sub-units are needed. For example, a new downstream application may require different processing operations than those available in the existing processing graph. The processing graph may then be updated by inserting instances of processing sub-units configured to perform the required processing. The operators in the processing graph can also be updated to route data through these newly deployed processing sub-units.

The steps shown in method 250 are merely examples and it should be apparent that more or different method steps may be involved. Additionally, steps 255-280 may be performed concurrently and on an ongoing basis while the data stream processing system is operational.

Referring now to FIGS. 3A-3D, shown therein are examples of various types of compositional operators. Compositional operators can be used to define the required processing subgraph for each downstream application by directing the appropriate data streams to the required data processing sub-units. The compositional operators can be configured to control what data is transmitted to downstream data processing sub-graphs. In some cases, the compositional operators may prevent data from being passed to downstream processing subgraphs and/or allow the data to be transmitted to a subset of the downstream processing sub-graphs. The compositional operators can also be used to combine data from a plurality of different data streams. The compositional operators may also be used to distribute or duplicate data streams.

For example, the data stream processing system may define a processing graph that includes a plurality of parallel data processing sub-units. In some cases, the parallel sub-units may include parallel instances of the same data processing sub-unit. In such cases, each of the parallel processing sub-units can be configured to modify data in the received data stream in the same manner. The compositional operators may then direct data to one of these parallel data processing sub-units.

In some cases, the parallel data processing sub-units may not perform the same processing operations. Rather, the parallel data processing sub-units may provide different processing operations and thus modify the received data in a different manner. The compositional operators may direct data to one or both of these parallel data processing sub-units.

Figure 3A:
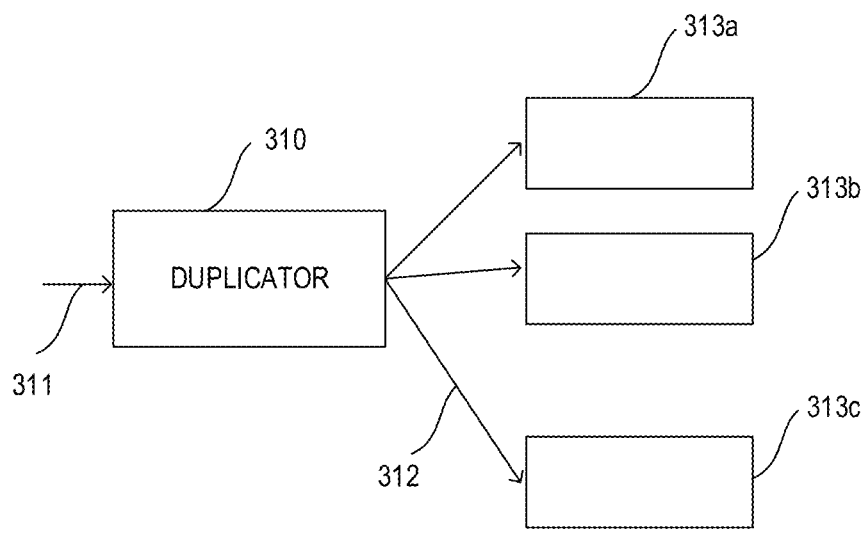
FIGS. 3A-3D are block diagrams of example operators that may be used in the data stream processing systems of FIGS. 2A and 2B in accordance with an embodiment.

FIG. 3A shows an example of a duplicator operator 310. The duplicator operator 310 is an example of a duplicative compositional operator.

The duplicator operator 310 can be configured to receive an input data stream 311 and replicate the input data stream 311 into a plurality of output data streams 312. Various configurations of the duplicator operator 310 may be implemented. In general, the duplicator operator 310 can receive a single input data stream 311 and output multiple streams 312 that include the data from that input data stream 311.

As shown in FIG. 3A, the duplicator operator 310 can be coupled to a plurality of parallel data processing sub-units 313a-313c. Each of the parallel data processing sub-units 313 may also be connected to the same preceding data processing sub-unit(s) in the processing graph via the duplicator operator 310. The duplicator operator 310 can transmit multiple copies of the input data stream that it receives, with one copy to each of the data processing sub-units 313a-313c.

The data processing sub-units 313a-313c may be configured to perform different processing operations. Accordingly, the data processing sub-units 313a-313c may correspond to a data processing sub-graph portion for different downstream analysis applications. For example, the data processing sub-units 313a-313c may each perform different feature extraction operations required by different analysis applications.

The input data stream 311 to the duplicator 310 may be provided as a synchronous pipe-based input. For instance, the duplicator 310 may receive the input data stream in a First-In-First-Out (FIFO) arrangement with a small buffer. In some embodiments, the duplicator 310 may also output synchronous data using pipes for each of the output data streams 312.

In other cases, the duplicator 310 may transmit the output data streams 312 using UDP. For instance, UDP multicast may be used to replicate the input stream 311 and transmit multiple output streams 312.

Figure 3B:
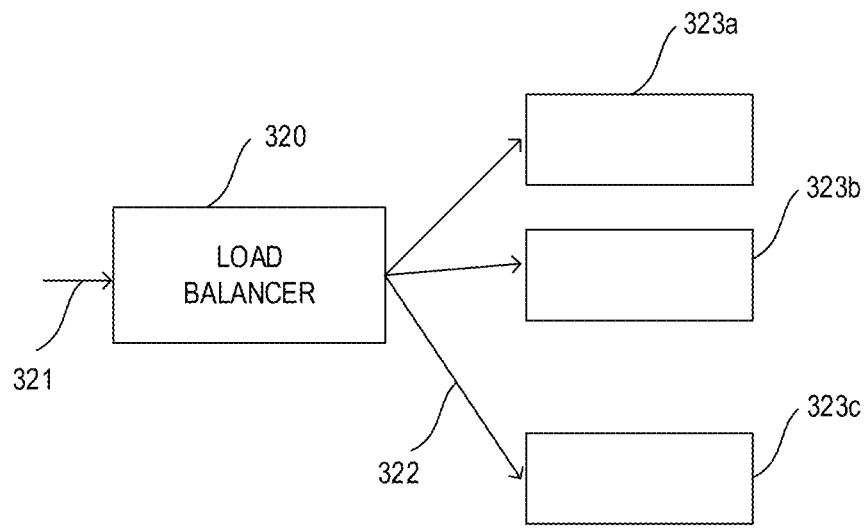

FIG. 3B shows an example of a load balancer operator 320. The load balancer operator 320 can be configured to receive an input data stream 321 and distribute the input data stream 321 amongst a plurality of output data streams 322. The load balancer operator 320 is an example of a distributive compositional operator that distributes data from the input data stream 321 into a plurality of separate output data streams 322. The load balancer operator 320 may transmit all of the data from the input data stream 321 to downstream data processing sub-units 323.

As shown in FIG. 3B, the load balancer operator 320 can be coupled to a plurality of parallel data processing sub-units 323a-323c. Each of the parallel data processing sub-units 323 may also be connected to the same preceding data processing sub-unit(s) in the processing graph via the load balancer operator 320. The load balancer operator 320 can transmit separate portions of the input data stream that it receives to each of the data processing sub-units 313a-313c.

Various configurations of the load balancer operator 320 may be implemented. In general, the load balancer operator 320 can receive a single input data stream 321 and distribute the data from the input data stream 321 to the downstream data processing sub-units 323a-323c in order to balance the data load on the data processing sub-units 323a-323c. For example, the load balancer operator 320 may distribute data from the input data stream 321 proportionally amongst the data processing sub-units 323a-323c. The load balancer operator 320 may use various load-balancing techniques, such as round robin load balancing or hash-based load balancing for example.

In some cases, the load balancer operator 320 may distribute the data amongst the data processing sub-units 323a-323c based on the performance of the data processing sub-units 323a-323c. For instance, the load balancer operator 320 may distribute data amongst the data processing sub-units 323a-323c to maintain a substantially consistent or even buffer fill for the data processing sub-units 323.

In various embodiments, the load balancer operator 320 may be configured to output data in various formats. In some examples, load balancer operator 320 may be configured to transmit data to the data processing sub-units 323 using a pipe-based transmission schema. The load balancer operator 320 may even use TCP if the system has sufficient bandwidth.

In some examples, the load balancer operator 320 may transmit data to the data processing sub-units 323 using UDP. This may facilitate scaling the data processing sub-units 323 while the system is operational, by adding or removing data processing sub-units, while the load balancer operator 320 continues to transmit data.

Figure 3C:
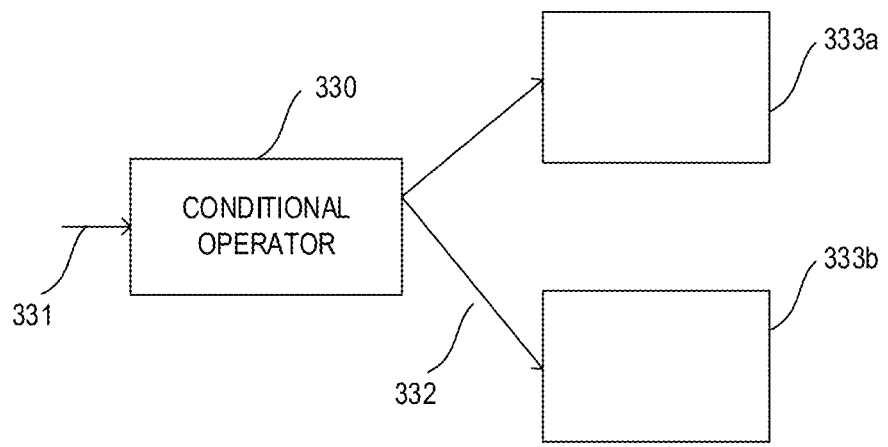

Referring now to FIG. 3C, shown therein is an example of a conditional operator 330. The conditional operator 330 is an example of a distributive compositional operator that can receive an input data stream and distribute the data in the input data stream amongst a plurality of downstream processing sub-units 333a-333b. In some cases, the conditional operator 330 may also operate as a duplicative, or partially duplicative, compositional operator.

The conditional operator 330 can be configured to receive an input data stream 331 and distribute the data in the input data stream 331 to one or more output data streams 332 based on whether the data satisfies a set of conditions. The conditional operator 330 can define a set of conditions associated with each of the output data streams 332. The conditional operator 330 can then determine, for each block of data (e.g. file) in the input data stream 331 whether that block of data satisfies defined conditions. The conditional operator 330 can then transmit the data to the corresponding one or more output data stream 332 or prevent the data from passing to the output data streams 332 based on whether the set of conditions is met.

For example, the conditional operator 330 may route a block of data to one of the data processing sub-units 333a or 333b based on the block of data satisfying a given condition. For instance, a block of data may be routed to data processing sub-units 333a or 333b according to whether it pertains to an IP address that is of ingress or egress type for a given network. The conditional operator 330 may be used to scale throughput in the downstream data processing sub-units 333a and 333b.

In some cases, the conditional operator 330 may be used to filter data for downstream processing sub-units 333. For instance, the downstream processing sub-units 333a and 333b may correspond to different processing operations required for different storage and/or analysis applications. These storage and/or analysis applications may require incoming data having different initial characteristics, or they may target different aspects of an incoming data stream. The conditional operator 330 may then direct the appropriate data to the appropriate data processing sub-unit 333a or 333b using the set of conditions to determine whether the block of data has characteristics appropriate for one or both of the downstream storage and/or analysis applications.

Figure 3D:
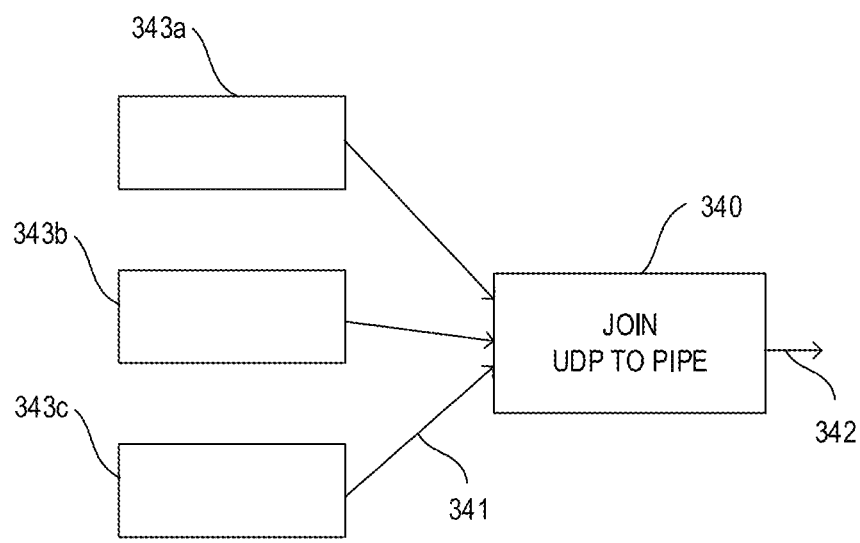

Referring now to FIG. 3D, shown therein is an example of a combiner operator 340. The combiner operator 340 receives a plurality of incoming data streams 341 from a plurality of upstream data processing sub-units 343a-343c.

The combiner operator 340 can then merge the incoming data streams 341 into a single output stream 342. The combiner operator 340 may combine the data in the incoming data streams 341 without regard to ordering of the data.

In the example shown, the combiner operator 340 is configured to join UDP data streams into a synchronous pipe data stream. Each incoming data stream 341 is received using the UDP transmission protocol. The combiner operator 340 can output the received data using a pipe-based communication protocol. The combiner operator 340 is an example of a compositional operator that may also operate as a connectivity operator in that it provides connectivity between processing segments using different communication protocols. Various other configurations of a combiner operator 340 may be implemented, including some that may not modify the communication protocol used to transmit data.

In general, the compositional operators 310, 320, 330 and 340 can be scaled while the data stream processing system is operational. This may allow the data stream processing system to update and modify the allocation of resources as new applications or new data sources are added to the data stream processing system. In various embodiments, the compositional operators 310, 320, 330 and 340 may be implemented as high-performance code on general purpose computing and/or special purpose hardware (FPGAs, GPUs, ASICs, special purpose processors).

Referring now to FIGS. 4A-4E, shown therein are various examples of connectivity operators. Connectivity operators can be used to provide the required connectivity between subsequent data processing sub-units in a data processing graph. The connectivity operators can be configured to modify the communication protocol being used to transmit a stream of data to account for the requirements of a given data processing sub-unit.

As explained above, the operators used in the data stream processing systems described herein may transmit data using various different communication protocols. Some of the operators can be configured to transmit data using UDP. This may provide flexibility in run time changes in services. UDP can also provide high throughput data transfer for systems where the data processing sub-units have sufficient bandwidth (and sufficient buffer space) to process all the received data.

Operators can also be configured to use other communication protocols to transmit data. For example, TCP or pipe-based communication protocols may be used to provide additional data transfer reliability and ensure that a data processing sub-unit receives the appropriate blocks of data required for the operations to be performed.

Figure 4A:
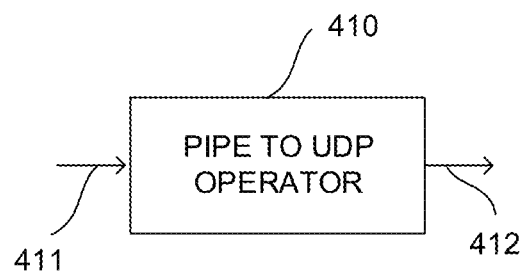
FIGS. 4A-4E are block diagrams of further example operators that may be used in the data stream processing systems of FIGS. 2A and 2B in accordance with an embodiment.

Referring now to FIG. 4A, shown therein is an example of a Pipe-to-UDP connectivity operator 410. Operator 410 can receive an incoming data stream 411 that is pipe-based and convert the data stream 411 to an outgoing UDP stream 412. The synchronous incoming data stream 411 can thus be converted to an asynchronous outgoing data stream 412. The Pipe-to-UDP operator 410 can also be configured to transmit data using UDP multicast to provide further flexibility in data output and transmission.

The incoming data stream 411 may correspond to the output data stream from a data processing sub-unit. The operator 410 may then route the output data stream from that data processing sub-unit to a downstream data processing sub-unit. By positioning the operator 410 to receive the output data stream from a data processing sub-unit, and then re-transmit the output data stream using UDP, the output data stream can be easily re-directed to a different downstream data processing sub-unit when the data processing graph is modified or updated. The operator 410 need not perform any initialization procedures prior to re-routing the outgoing data stream 412, which can facilitate updating the processing graph in real-time.

Figure 4B:
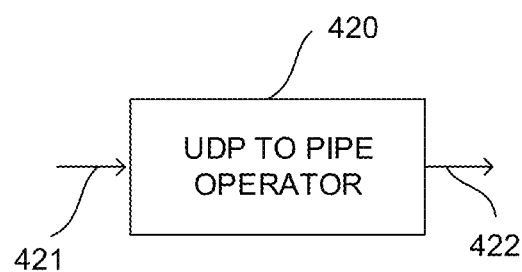

Referring now to FIG. 4B, shown therein is an example of a UDP-to-Pipe connectivity operator 420. Operator 420 can receive an incoming data stream 421 in UDP and convert the data stream 421 to an outgoing pipe-based stream 422. The asynchronous incoming data stream 421 can thus be converted to a synchronous outgoing data stream 422. The operator 420 can listen to a corresponding UDP socket and write the data it receives to a pipe 422.

The Pipe-to-UDP operators 410 and UDP-to-Pipe operators 420 can be used to introduce parallel instances of a data processing sub-unit and thus scale the total throughput of the data processing sub-unit. The Pipe-to-UDP operator 410 and UDP-to-Pipe operator 420 may facilitate establishing loose couplings between consecutive data processing sub-units or data processing sub-unit segments. This may allow data to be redirected through newly deployed data processing sub-units on the fly.

For example, a data processing segment (such as segments 240 shown in FIG. 2B) can be configured with a UDP-to-Pipe operator 420 as the input operator and a Pipe-to-UDP operator 410 as the output operator. The sequence of data processing sub-units within the segment may then communication data using a pipe to facilitate data reliability. Additionally, the input operator and output operator can be easily adjusted to change where the incoming data stream is coming from and where the outgoing data stream is going to because the data is being transmitted using UDP. Additionally, newly deployed data processing sub-units can be connected using the multicast functionality of the Pipe-to-UDP operator 410.

For example, N parallel Pipe-to-UDP multicast connector operators may direct their data to M UDP-to-Pipe connector operators to create a data bus. In another example, N parallel Pipe-to-UDP unicast connector operators may direct their data to a single UDP-to-pipe connector operator to create a join.

Figure 4C:
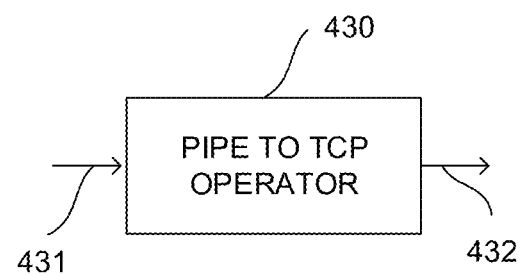

Referring now to FIG. 4C, shown therein is an example of a Pipe-to-TCP connectivity operator 430. Operator 430 can receive an incoming data stream 431 that is pipe-based and convert the data stream 431 to an outgoing TCP stream 432. The Pipe-to-TCP operator 430 may provide reliable server-to-server transfer when data is being transmitted through multiple links involving multiple switches and buffers. Pipe-based communication may omit buffering. Accordingly, converting the data transmission to TCP may facilitate the transmission of data over longer distances, such as between remote servers.

Figure 4D:
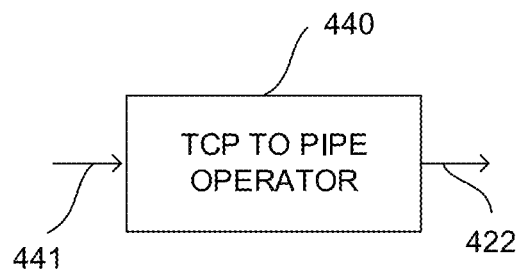

Referring now to FIG. 4D, shown therein is an example of a TCP-to-Pipe connectivity operator 440. Operator 440 can receive an incoming data stream 441 in TCP and convert the data stream 441 to an outgoing pipe-based stream 442. The operator 440 can listen to a corresponding TCP socket and write the data it receives to a pipe 442. Operator 440 can convert data from using TCP transfer with buffering to pipe-based transfer that can omit buffers. The operator 440, in conjunction with operator 430, may be usable to provide reliable (i.e. low loss) transfer of data streams.

Figure 4E:
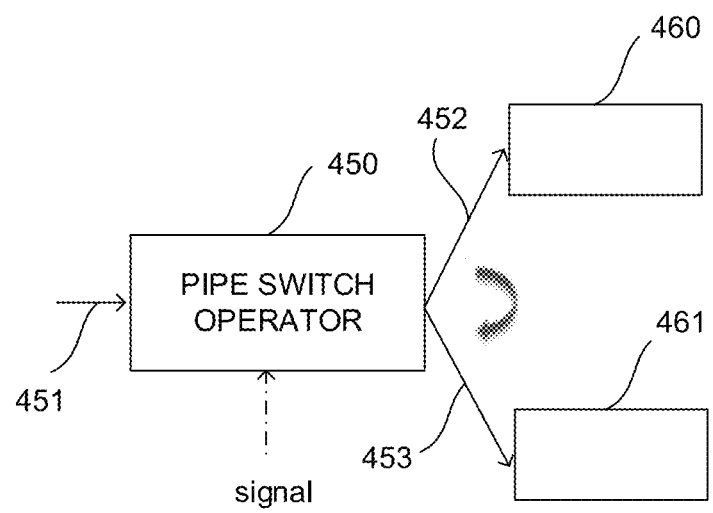

Referring now to FIG. 4E, shown therein is an example of a pipe-switch operator 450. The pipe-switch operator 450 can be used to adjust or switch the downstream destination of data from an incoming data stream 451 between two different output data streams 452 and 453. The pipe switch 450 may be used to switch the outgoing data stream between different data processing sub-units 460 and 461. For instance, where data processing sub-unit 460 is being updated or replaced by data processing sub-unit 461, the pipe-switch operator 450 can redirect the flow of data from data processing sub-unit 460 to data processing sub-unit 461 in real-time during runtime without interrupting the data flow. This may allow, for instance, the set of templates or enrichment data used by data processing sub-unit 460 to be replaced while data continues to be transmitted and processed.

In some cases, a pipe switch 450 may be positioned in a processing graph upstream from a data processing sub-unit that may be expected to be modified or updated. For example, a pipe switch 450 may be positioned upstream from an enrichment processing sub-unit that may be updated or modified frequently. This may facilitate rapid replacement and updating of the enrichment processing sub-unit.

Figure 5A:
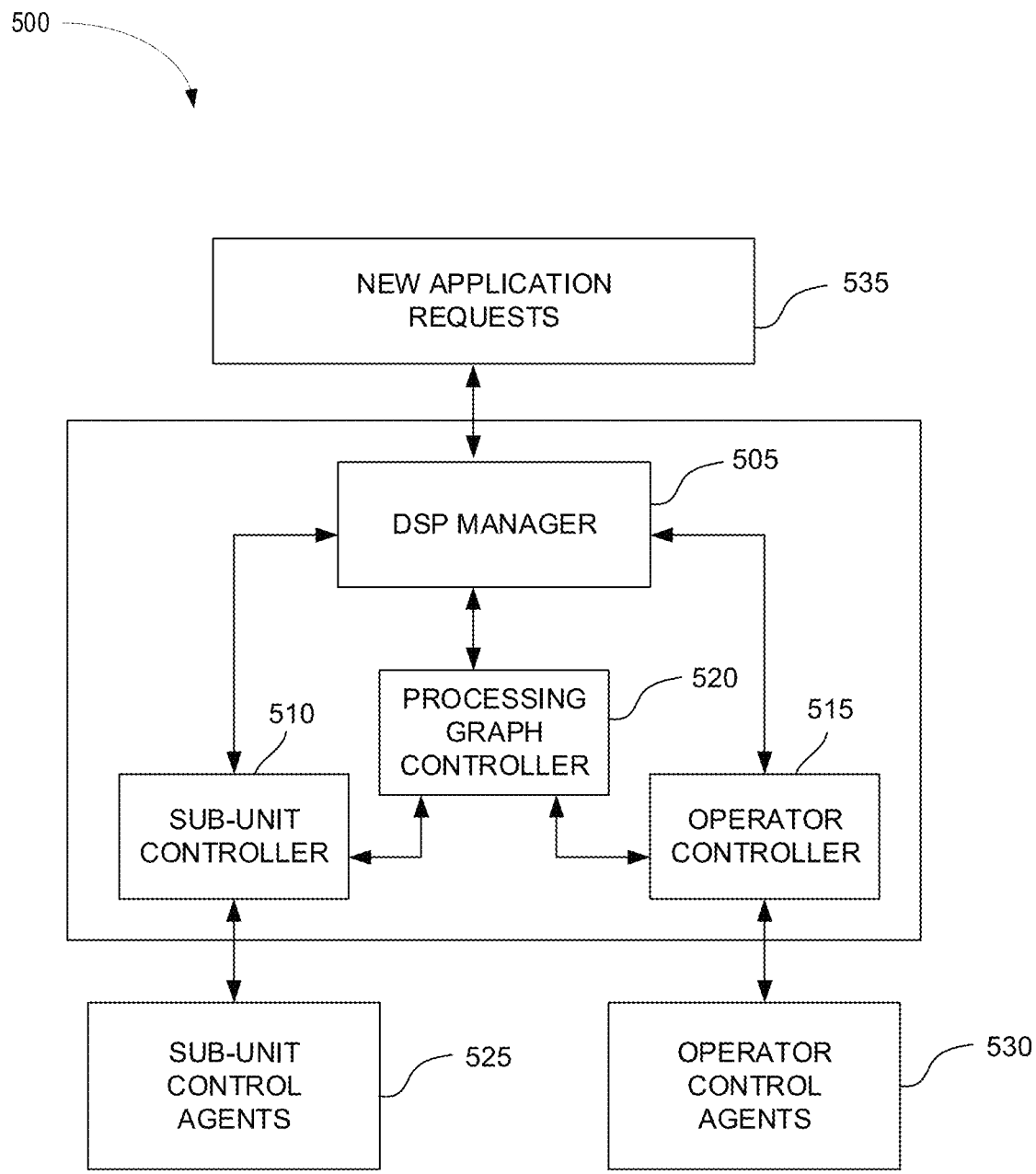
FIG. 5A is a block diagram of a control sub-system that may be used with the data stream processing systems of FIGS. 2A and 2B in accordance with an embodiment.
Figure 5B:
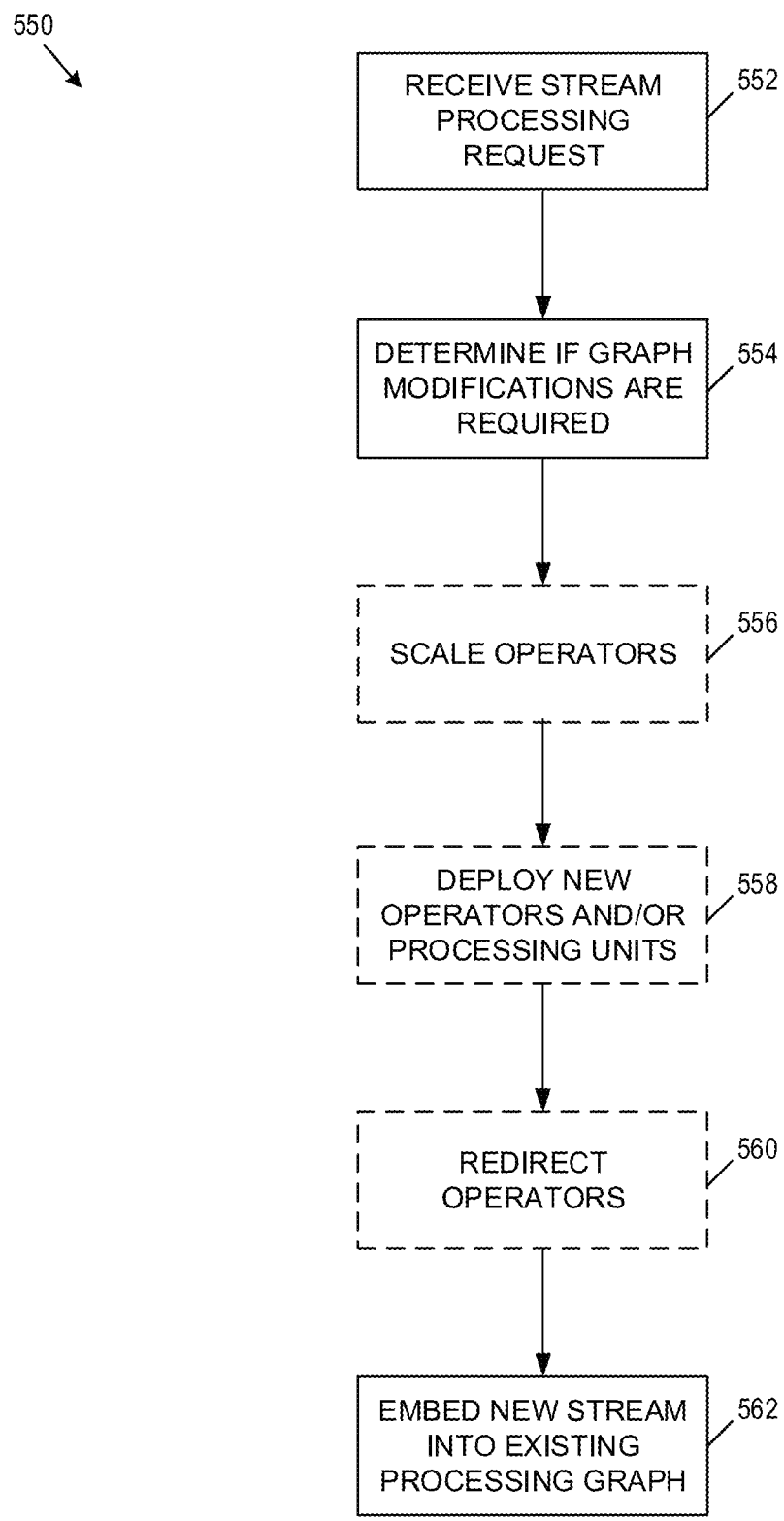
FIG. 5B is a flowchart illustrating a method of updating a data stream processing system in accordance with an example embodiment.
Figure 5C:
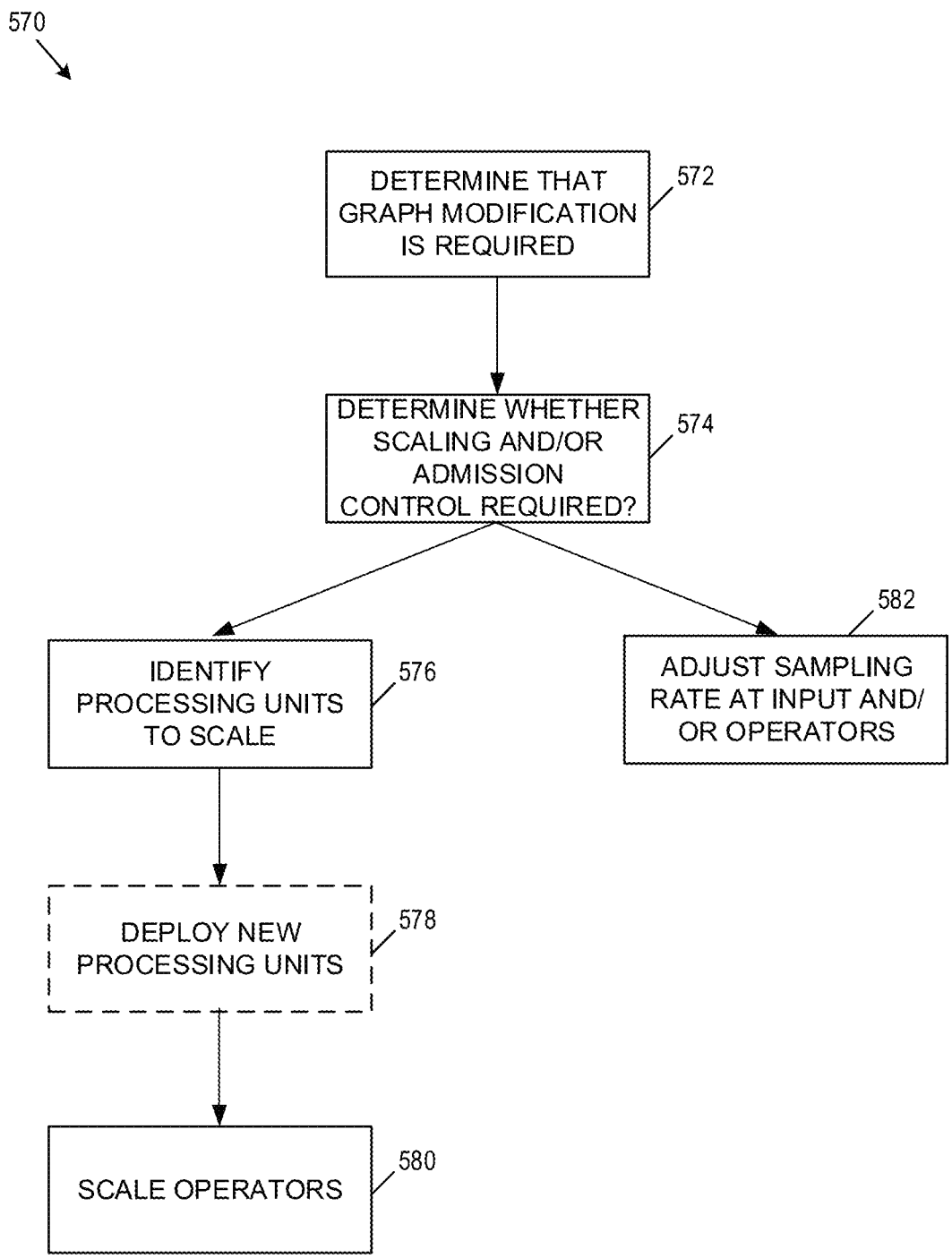
FIG. 5C is a flowchart illustrating another method of updating a data stream processing system in accordance with an example embodiment.

Referring now to FIG. 5A, shown therein is an example of a control system 500. The control system 500 may be used in implementations of data processing system 100 and data stream processing systems 105, 200a and 200b. The control system 500 may also be referred to herein as a controller and/or system manager.

The controller 500 can be used to manage the configuration of the components within a data stream processing system. The controller 500 can manage the deployment of data processing sub-units and operator. The controller 500 can also manage the connections between the operators and data processing sub-units to define a data processing graph. The controller 500 may also be used to monitor the status and processing requirements for the processing graph of the data stream processing system and modify the processing graph as required.

The controller 500 can be coupled to the plurality of data processing sub-units and the plurality of operators in the data processing graph. The controller 500 can also be coupled to the data output units (e.g. data storage and/or analysis applications) that receive data streams output from the data processing graph. The controller 500 can also be connected to the input of the data stream processing system to identify the incoming data streams connected thereto.

The controller 500 can include a data stream processing (DSP) manager 505 and a processing graph controller 520. The DSP manager 505 and processing graph controller 520 can be used to ensure that the data stream processing system is operating reliably and to provide the processing required for downstream analysis applications.

The processing graph controller 520 can be used to monitor the status and performance of the data processing sub-units and operators that are currently deployed. The processing graph controller 520 can communicate with a processing sub-unit controller 510 and an operator controller 515. The sub-unit controller 510 and, in turn, monitor the status and performance of the deployed data processing sub-units using sub-unit control agents 525. Similarly, the operator controller 515 can monitor the status and performance of the deployed operators using operator control agents 530.

The sub-unit control agents 525 and operator control agents 530 may correspond to the sub-unit monitoring agents 221 and operator monitoring agents 211 shown in FIG. 2A and described herein above. In general, the sub-unit control agents 525 and operator control agents 530 can monitor various performance characteristics, such as memory, CPU, bandwidth usage, throughput, input data rate, output data rate etc. for the data processing sub-units and operators connected thereto.

The sub-unit controller 510 and operator controller 515 may then collect the monitoring data from all of the data processing sub-units and operator sub-units and provide this monitoring data to the processing graph controller 520. The processing graph controller 520 may then determine the status and processing capability of the data processing graph as a whole.

The DSP manager 505 can be configured to determine whether modifications to the data processing graph are required. The DSP manager 505 can monitor the processing requirements for the data processing graph based on the data output units (e.g. data storage and/or analysis applications) and incoming data streams coupled to the data processing graph.

For example, the DSP manager 505 can receive requests for new or different data output units (e.g. data storage and/or analysis applications) to be connected to the data stream processing system. The DSP manager 505 may then update the processing requirements for the data stream processing graph based on the data required by the data output units (e.g. data storage and/or analysis application) to function. Similarly, where applications are removed and thus no longer require output from the data stream processing system, the DSP manager 505 can update the processing requirements accordingly.

The DSP manager 505 can also monitor the number and type of incoming data streams connected to the data stream processing system. When there are changes to the incoming data streams, the DSP manager 505 can update the processing requirements of the data stream processing system (e.g. to indicate that a new incoming data stream needs to be processed).

The DSP manager 505 can also determine whether the data processing graph requires any updates or modifications. The DSP manager 505 may compare the determined processing requirements to the processing capabilities identified by the processing graph controller 520. The DSP manager 505 may then determine whether there is a mismatch between the existing processing requirements and the processing capabilities.

The DSP manager 505 may identify updates that are required to the data processing graph to account for the mismatch in the data processing requirements and capabilities. For example, the DSP manager 505 may identify new and/or different data processing sub-units and/or operators that can be deployed to provide the necessary processing functionality. The DSP manager 505 may then modify the processing graph by deploying new and/or different data processing sub-units and or operators, updating the connections between operators and data processing sub-units, and/or redirecting data that is transmitted by one or more operators. For instance, the DSP manager 505 may transmit instructions to the sub-unit controller 510 and/or operator controller 515 to modify the configuration of the data processing sub-units and/or operators in the data processing graph. The DSP manager 505 can modify the processing graph while the system is operational, for instance using operators configured to transmit data using UDP.

Although shown as different elements, it should be understood that the functions of the DSP manager 505, processing graph controller 520, processing sub-unit controller 510 and operator controller 515 may for instance be implemented as a combined management controller.

In some embodiments, the controller 500 may operate autonomously, or semi-autonomously to define and update the data processing graph. For example, the controller 500 may receive application requests, determine any modifications required to provide the requested application with the necessary processed data, and automatically update the data processing graph to provide the required processing functionality. An example of a process for modifying the data processing graph in response to an application request is shown in FIG. 5B.

Similarly, the controller 500 may monitor the operation of the data processing graph and determine that the data processing graph is not providing the desired processing functionality, or performance is about to degrade, based on the monitored status and/or performance of the data processing graph. The controller 500 may then automatically update the data processing graph to ensure that the data processing graph continues to provide the required processing functionality. An example of a process for modifying the data processing graph based on monitoring of the processing graph is shown in FIG. 5C.

In some embodiments, the controller 500 may be coupled to an administrator computer. The controller 500 may transmit notifications to the administrator computer such as alerts regarding performance issues or additional processing requirements. A user of the administrator computer may then direct the controller 500 to implement modifications to the data processing graph to account for the performance issues and/or changes to processing requirements.

In some instances, the controller 500 may also identify the required modifications and then present those modifications for approval by the user of the administrator computer.

In some embodiments, the controller 500 may operate to update the data processing graph automatically within certain defined constraints. For instance, an administrator may define a range of resources that the controller 500 can access automatically. In such embodiments, if the controller 500 determines that additional resources may be required to provide the required processing functionality, the controller 500 may then transmit an alert to the administrator computer indicating that approval for additional resources may be required. A user of the administrator computer may then approve or deny the request for additional resources.

In some embodiments, the operation of the controller 500 may be facilitated using a language to describe the processing graph of data processing sub-units and operators. The language may be used in a user interface provided to an administrator computer in communication with controller 500. A user of the administrator computer can use the language to define new application request 635.

The language may facilitate the orchestration and deployment of new data processing sub-units and operators. The language can be used by graph controller 520 to determine what adaptation actions are required, e.g. scaling of resources and/or rate limiting at the ingress to the overall system.

For example, Python may be used to define a processing graph at a high level by specifying the data processing sub-units, their configurations, and their interconnections using operators. Python scripts may then be used to generate a JSON representation of the graph that can be passed to other modules, such as for control, monitoring, scaling, deployment, and drawing. FIG. 7C is an example of a visual representation of a processing graph generated in this manner.

Referring now to FIG. 5B, shown therein is an example process 550 for updating a data processing graph. Update process 550 is an example of a process that may be used to update a data processing graph in response to a change in the analysis applications or incoming data streams connected to a data stream processing system. Process 550 may be used in various embodiments of data processing system 100 and data stream processing systems 105, 200a and 200b.

At 552, a stream processing request can be received. For example, the DSP manager 505 may receive a request to support a new data output unit (e.g. data storage and/or data analysis application) or a new incoming data stream. The request may identify a new data output unit (e.g. data storage and/or data analysis application) or data source to be connected to the data stream processing system.

In some cases, the DSP manager 505 may receive a processing request from a data output unit (e.g. data storage and/or data analysis application) that is already connected to the data stream processing system. For instance, the data output unit (e.g. data storage and/or data analysis application) may have been updated and thus requires different processing functionality.

The DSP manager 505 may determine, based on the received requests, the processing functionality required to implement the requested data storage and/or analysis application or data source.

In some cases, the DSP manager 505 may also determine that a data output unit (e.g. data storage and/or data analysis application) or data source is no longer being used (and thus no longer requires processed data from the data stream processing system). The DSP manager 505 may then determine updated processing requirements for the data streaming processing system based on the remaining data output units (e.g. data storage and/or data analysis applications) and data sources.

At 554, the controller 500 can determine whether the processing graph is configured to satisfy the processing request. The DSP manager 505 may compare the existing processing functionality, e.g. using performance and status data on the deployed data processing sub-units and operators from the processing graph controller 520, with the updated processing requirements.

The DSP manager 505 may determine whether the existing processing status of the data stream processing system (using status data from the processing graph controller 520) can satisfy the processing functionality required by the change in data output units (e.g. data storage and/or data analysis applications) and/or data sources identified at 552. The DSP manager 505 may also determine whether the new processing requirements may result in adverse effects on the existing processing system (e.g. introducing additional data sources may increase the volume of data being processed, which may increase the data processing bandwidth required). Upon determining that the processing graph is not configured to satisfy the processing request, the DSP manager can modify the processing graph to enable the processing graph to satisfy the processing request.

In some cases, the DSP manager 505 may determine that little to no modifications are required to the data stream processing system. For instance, the DSP manager 505 may determine that an existing outgoing data stream can provide a new data output unit (e.g. data storage and/or data analysis application) with the required processing data. The DSP manager 505 may then simply couple the new data output unit (e.g. data storage and/or data analysis application) to that outgoing data stream as well.

Similarly, the DSP manager 505 may determine that an incoming data source can be processed in a manner analogous to an existing incoming data stream. The new incoming data stream may then be directed to the same processing sub-graph as the corresponding existing data stream. In some cases, the DSP manager 505 may also determine that the existing processing sub-graph may require additional parallel processing segments and/or sub-units to account for the increased data volume. The DSP manager 505 may then direct the deployment of the additional processing instances (and any corresponding operators required).

In some cases, the DSP manager 505 may determine that a modification to the data stream processing system can be made, but is not required. For instance, when a data output unit (e.g. data storage and/or data analysis application) or data source is no longer being connected the DSP manager 505 may determine that some data processing sub-units may be removed. In some cases, the DSP manager 505 may then remove those data processing sub-units from the data processing graph to reduce power and resource utilization.

If modifications are required to the data processing graph, the DSP manager 505 can determine an updated data processing graph required to provide the new processing functionality. The DSP manager 505 may identify the overall data processing graph required for the new processing functionality and then the modifications required to provide the updated data processing graph.

The modifications to provide the updated data processing graph may involve scaling existing data processing sub-units and/or modifying the connections provided by existing operators. In some cases, the modifications may include deploying new operators and/or data processing sub-units. The DSP manager 505 can then manage the updates to the data processing graph at 556 to 560. The DSP manager 505 may provide instructions to the processing controller 510 and operator controller 515 to implement the required modifications.

As shown in FIG. 5B, the steps 556-560 may be considered optional in the sense that not all steps need to be performed to update the processing graph. In some cases, all of steps 556-560 may be performed to update the processing graph to provide the processing functionality identified at 552 and 554. However, in some embodiments updating the processing graph may require only redirecting some operators or scaling of processing sub-units along with associated redirection of operators for example. Various other permutations may also be used depending on the specific updates to the processing graph that are required.

At 556, one or more operators in the processing graph may be scaled. To scale the operators, additional instances of one or more operators may be positioned in parallel to increase the available bandwidth for the operation performed by that given operator. For instance, multiple connectivity operators may be deployed in parallel to increase the rate of data that can be converted from one communication protocol to another. Similarly, multiple compositional operators may be deployed in parallel to increase the rate at which data is directed to the appropriate downstream processing sub-units.

Scaling the operators may also involve adjusting the connections between operators and other operators or data processing sub-units. For instance, the parallel instances of an operator may be connected to the same upstream operator or data processing sub-unit or the same downstream operator or data processing sub-unit. Scaling operators may thus involve updating the connectivity to those existing operators and/or data processing sub-units.

At 558, one or more new operators and/or data processing sub-units can be deployed. The DSP manager 505 may deploy new operators to support updating the connections between the processing sub-units in the data processing graph. New data processing sub-units can be deployed to support new processing functions that are required as a result of the new data source and/or data output unit (e.g. data storage and/or data analysis application). In some cases, additional instances of existing data processing sub-units may be deployed in parallel to increase the bandwidth available for certain processing functions.

In some embodiments, newly deployed data processing sub-units may provide processing operations that are different from the existing data processing sub-units in the data processing graph. This may occur, for instance, where the data from the new data source has characteristics requiring new types of processing operations. This may also occur, for instance, where the new data output units (e.g. data storage and/or data analysis applications) requires different features to be extracted or different enrichment data.

In some embodiments, newly deployed data processing sub-units may be instances of data processing sub-units already present in the data processing graph. This may occur to provide parallel processing sub-units. In other cases, this may be done so that a different processing sub-graph undergoes the processing operations for that data processing sub-unit. Rather than redirecting data through an existing data processing sub-unit, it may be simpler to add a new instance of that sub-unit.

In some embodiments, the operators and data processing sub-units can be deployed as data processing segments. For instance, data processing segments such as data processing segment 240, or those shown in FIGS. 6A, 6B, and 7A-7C may be deployed as a collective segment. Collectively, the processing segment may provide processing functionality that corresponds to a particular analysis application or incoming data sources. This may facilitate updating the data processing graph as the data processing segments for certain processing functions can be defined in advance and then deployed by DSP manager 505 as required, without needing to determine a sequence of operators and processing sub-units after a processing request is received.

Deploying data processing segments may also facilitate updating the connections between the existing processing sub-units and operators and the newly deployed segment. For instance, the data processing segments can be bookended by a connector input operator and connector output operator respectively suitable to connect to operators upstream and downstream from where that data processing segment is to be deployed. This may ensure that connectivity to the new data processing segment can be achieved during runtime while the system is operational.

For example, the data processing segment may include a UDP-to-Pipe connector as the input operator and a Pipe-to-UDP connector as the output operator. This may allow the data processing segment to automatically begin receiving data using UDP once deployed (and once the upstream and downstream operators/data processing sub-units are connected thereto) and to ensure that the received data can be routed through the sequence of data processing sub-units appropriately.

At 560, the operators in the data processing sub-graph can be updated to redirect data to new and/or different operators or data processing sub-units. For instance, where a new data processing sub-unit is deployed at 558, an operator upstream from that newly deployed processing sub-unit can redirect some, or all, of the data it is transmitting to that newly deployed processing sub-unit. Similarly, operators downstream from the newly deployed data processing sub-unit and/or operator can be configured to receive data from the output of the newly deployed operators and/or data processing sub-units.

At 562, the new incoming data stream or outgoing data stream can be connected to the data processing graph. The DSP manager 505 may also provide instructions to the processing controller 510 and operator controller 515 to synchronize the updates to the data processing graph, with the implementation of the new incoming or outgoing data stream. This can ensure that the required processing functionality is in place prior to inserting a new data output unit (e.g. data storage and/or data analysis application) and/or data source.

A similar procedure may be followed where the DSP manager 505 determines that an updated version of an operator or data processing sub-unit exists and should be deployed. Using steps 556-560, the DSP manager 505 can deploy the updated version of the operator or data processing sub-unit and update the data processing graph as required to redirect data through the updated component.

Referring now to FIG. 5C, shown therein is an example process 570 for updated a data processing graph. Update process 570 is an example of a process that may be used to update a data processing graph in response to monitoring the status and/or performance of a data stream processing system. Process 570 may be used in various embodiments of data processing system 100 and data stream processing systems 105, 200a and 200b.

The DSP manager 505 can monitor the status and/or performance of the data processing graph using collected data provided by processing graph controller 520. The processing graph controller 520 can be configured to monitor the performance of each data processing sub-unit and each operator. For instance, CPU usage, memory usage, buffer usage and bandwidth for each data processing sub-unit and operator may be monitored.

At 572, the DSP manager 505 can determine that a modification to the data processing graph is required. The DSP manager 505 may determine that one or more data processing sub-units and/or operators have reached performance thresholds indicating an undesired level of performance or that an undesired level of performance is likely to occur.

The controller 500 may define various operational requirements for the data stream processing system. For instance, each of the data processing sub-units and operators within a data processing sub-graph that leads to a given data output unit (e.g. data storage and/or data analysis application) may have associated operational requirements such as latency requirements, loss requirements etc. The controller 500 may also define monitoring and performance thresholds corresponding to the operational requirements. The performance thresholds may be defined in relation to the processing operations of a data processing sub-unit or operator (e.g. throughput, input data rate, output data rate, loss rate etc.) and/or in relation to the status of the data processing sub-unit or operator (e.g. CPU usage, memory usage, buffer fill etc.). The performance thresholds can be defined to ensure that the operators and data processing sub-units can provide the required processing functionality. Accordingly, the performance thresholds may be defined so that modifications can be performed before unacceptable performance degradations occur.

As explained herein above, the controller 500 can monitor the status and performance of each operator and data processing sub-unit. Based on this monitoring, the controller 500 can determine that one or more thresholds has been reached. When a performance threshold has been reached, the controller 500 may determine that a modification to the data processing graph is required to ensure that the operational requirements of the data processing graph continue to be met.

Operator monitoring agents and data processing sub-unit monitoring agents can be configured to monitor the status of corresponding operators or data processing sub-units. These monitoring agents can generate alerts when a performance threshold is reached or exceeded. For example, the monitoring agents may identify performance deficiencies such as an input data rate overload, an output data rate being too low, and/or a subunit fault. In some cases, the processing graph controller 520 may identify a performance threshold being reached based on monitoring data from a plurality of monitoring agents (e.g. a load imbalance). In some cases, the processing graph controller 520 may also monitor the input rate and output rate of the incoming and outgoing data streams to identify potential performance deficiencies. For instance, the processing graph controller 520 may identify an increase in the incoming data volume that may overwhelm the capacity of the existing data processing graph.

The processing graph controller 520 may then transmit to DSP manager 505 an alert indicating that the performance threshold has been reached. DSP manager 505 may then determine that a modification to the graph is required to ameliorate the performance deficiency or prevent the performance deficiency from occurring.

At 574, the DSP manager 505 may determine what modifications may be required to the data processing graph to avoid or remedy the performance deficiencies identified at 572. The DSP manager 505 may determine whether scaling of resources or rate limiting may be required to adapt to the changes in demand or resource capacity identified at 572.

In some cases, the DSP manager 505 may determine that the resources (e.g. virtual machines or containers) corresponding to the data processing sub-units and/or operators need to be scaled or deployed to adapt to the performance issues identified at 572. The DSP manager 505 may then modify the processing graph to response to the identified performance deficiency.

At 576, the DSP manager 505 can identify the data processing sub-units that can be scaled to account for the performance deficiency identified at 572. For instance, where the performance deficiency relates to a data processing sub-unit that is nearing or reaching a buffer fill threshold, the DSP manager 505 may determine that additional instance of that sub-unit should be deployed in parallel.

At 578, the DSP manager 505 can direct the deployment of the data processing sub-units identified at 576. In general, the data processing sub-units may be deployed in a manner analogous to step 560 of method 550. For instance, parallel instances of data processing sub-units may be deployed to provide increased throughput for a given processing function. As with method 550, the data processing sub-units and operators can be deployed as processing segments.

In some cases, data processing sub-units can be deployed to replace existing data processing sub-units. For instance, existing data processing sub-units may be determined to be faulty or requiring an updated. Functioning or updated data processing sub-units can be deployed and the data can be redirected to the newly deployed processing units. As at 562, the operators can be redirected to direct data to and from the newly deployed data processing sub-units.

At 580, operators in the data processing graph can be scaled to account for the performance deficiency. For example, additional operators may be deployed to increase throughput as required. Similarly, the connections between the operators and other operators and/or data processing sub-units may be updated in a manner analogous to step 564 of method 550.

In some cases, the DSP manager 505 may determine that admission control techniques should be applied to reduce the volume of data being processed. In such cases, the method 570 can proceed to step 582.

At 582, the DSP manager 505 can determine that the rate of data passing through the data stream processing is to be reduced. In some cases, the DSP manager 505 may then modify the operation of the input connection to limit the rate of data entering the data stream processing system. In some cases, the DSP manager 505 may throttle the rate of data entering individual operators and/or data processing sub-units.

The DSP manager 505 may transmit instructions to reduce the rate of data entering the data stream processing system by dropping or sub-sampling the data from the incoming data streams. The DSP manager 505 may drop or subsample data entering the data stream processing system to account for surges in data in one or more incoming data streams and/or deficiencies/degradations in the available resources. This may ensure that the data that enters the data stream processing system can be processed accurately and rapidly. In some cases, the DSP manager 505 may control the volume of data entering the data stream processing system temporarily while the resources in the processing graph are scaled to account for performance deficiencies.

For example, the first data processing sub-unit that receives data from an incoming data stream may be configured to prevent data from entering the data stream processing system. The DSP manager 505 may transmit instructions to that data processing sub-unit to drop packets/messages from the incoming data to reduce the volume of data entering the system. By controlling the data entering the data stream processing system at the input, the DSP manager 505 may ensure there is consistency in the data processed throughout the data stream processing system (across the various processing sub-graphs). This may provide unbiased dropping of data so that no specific data processing sub-graph is impacted unevenly.

In some cases, individual operators and/or data processing sub-units may be configured to rate limit their input data. The DSP manager 505 may determine that individual processing sub-units and/or operators require a reduced volume rate and direct those components to limit the rate of volume entering those sub-units or operators. In such cases, the individual operators and/or data processing sub-units may drop or subsample messages/packets they receive. This may provide more selective data limiting to ensure that an increased volume of data is analyzed overall. In some cases, rate limiting individual operators and/or data processing sub-units may be performed temporarily while resources are scaled to account for the data processing deficiency identified at 572.

Referring now to FIGS. 6A-6B, shown therein are examples of data processing segments that may be used with data stream processing systems such as data stream processing systems 105, 200a and 200b. FIGS. 6A and 6B are examples of data processing segments that may be used to process large volumes of network monitoring data, such as NetFlow and similar network flow monitoring data.

FIG. 6A shows an initial data collection and parsing segment. A data collection input 601 can provide an incoming data stream or streams of network monitoring messages. For instance, the incoming data stream may include NetFlow (IPFIX) messages.

The incoming data stream 601 can be received by a load balancing operator 600. The load balancing operator 600 can distribute the network monitoring messages 609 amongst a plurality of downstream collector processing sub-units 610. In the example shown here, the load balancing operator 600 transmits network monitoring messages 609 using UDP.

The collector processing sub-units 610 can be configured to generate network flow records 611 from the received network monitoring messages 609. The network flow records 611 may be augmented flow records corresponding to the receive network monitoring messages with additional information added. For example, geolocation information may be added to the network monitoring messages 609. In some cases, the collector processing sub-units 610 may be implemented as nProbes.

The network flow records may be generated in a first format. For example, the network flow records may be generated using a JavaScript Object Notation (JSON) format. The JSON format typically produces large files that may be bandwidth intensive.

The collector processing sub-units 610 can transmit the network flow records 611 to a corresponding plurality of parser sub-units 620. In some embodiments, the collector processing sub-units 610 and parser sub-units 620 may communicate using TCP. This may increase the reliability of data transfer between the collector processing sub-units 610 and the parser sub-units 620.

Each of the parser sub-units 620 can generate parsed network flow records 612 from the network flow records received from the corresponding collector processing sub-unit 610. The parser sub-units 620 may convert the network flow records from the first format to a second format that is easier to transmit. The second format may have a smaller file size than the first format. For example, the parser sub-units 620 may generate the parsed flow records in a CSV file format. In other cases, the parser sub-units 620 may even generate parsed flow records in binary.

The plurality of parser sub-units 620 can transmit the parsed flow records 612 to a combiner operator 630. The combiner operator 630 can receive the parsed flow records 612 from the plurality of parser sub-units 620 and combine them into a single data stream.

In the example shown, each parser sub-unit 620 is configured to transmit the parsed network flow records using the User Datagram Protocol (UDP). The combiner operator 630 can be configured to receive the parsed flow records 612 from the parsers 620 using UDP and output a single data stream 631 as a pipe-based output. The combiner operator 630 may thus combine the parsed network flow records 612 into a synchronous output stream 631.

The number of collector processing sub-units 610 and parser sub-units 620 in the data processing segment can be selected based on the aggregate rate of network monitoring messages arriving at 601. Depending on the arrival rate of the network monitoring messages, a controller 500 may adjust the number of collector processing sub-units 610 and parser sub-units 620.

The number of collector processing sub-units 610 and parser sub-units 620 may be adjusted until the capacity of the load balancer 600 or combiner 630 is reached. Once this capacity is reached, one or both of the load balancer 600 or combiner 630 may be scaled. In other cases, an additional data processing segment may be implemented in parallel.

In some embodiments, the parsed network flow records 612/631 may require enrichment data to facilitate downstream processing. FIG. 6B illustrates an example of a data processing segment that may be used to insert enrichment data into the parsed network flow records 612/631.

In general, at least one stream enrichment processing sub-unit 650 can be coupled to the parsed network flow records 631. Each stream enrichment processing sub-unit 650 can be configured to generate enriched network flow records 651 by inserting enrichment data into received parsed network flow records 631.

In embodiments of FIG. 6B, the stream enrichment processing sub-units 650 can receive parsed network flow records (i.e. the information content of the parsed network flow records) and insert additional information to facilitate subsequent processing. The stream enrichment processing sub-unit 650 may examine the values in the received data stream and add contextual information related to the received data. For example, an IP address included in a parsed network flow record may be enriched by adding the autonomous system that it belongs to, its geographic location such as its source country, and other information. The enrichment data may provide a richer set of data usable by a downstream analysis application.

In some embodiments, the enriched data stream may be provided to a data storage application for storage. The stream enrichment processing sub-unit 650 may add time index data to the received data (e.g. in headers of the processed data files). This may allow the data storage application to store the processed data stream in a time-ordered manner. This may facilitate subsequent access, playback, processing, and analysis etc. In some cases, a compression sub-unit may also be included prior to the data storage application to compress the data in the output data stream prior to storage.

In some cases, a switching operator may be positioned upstream from the stream enrichment processing sub-unit 650. The switching operator may be usable to direct the parsed network flow records between different stream enrichment processing sub-units 650.

In some embodiments, a plurality of stream enrichment processing sub-units 650 may be positioned in parallel. The switching operator operable can be configured to direct the parsed network flow records to a subset of the stream enrichment sub-units in the plurality of stream enrichment sub-units. In some embodiments, a first subset of stream enrichment sub-units may correspond to a first set of enrichment data and a second subset of stream enrichment sub-units may corresponds to a different set of enrichment data.

The switching operator may be configured to direct all of the parsed network flow records to a particular subset of the stream enrichment sub-units. For instance, the switching operator may be used where the enrichment sub-units are being updated/replaced to redirect the parsed network flow records to the new/updated enrichment sub-units.

As shown in the example of FIG. 6B, the switching operator 640 can be implemented as a pipe switch operator (see also FIG. 4E described herein above). The pipe switch operator may be used to redirect the parsed network flow records to a new/updated enrichment sub-unit 650.

In some cases, the switching operator may be conditional operator that is configured to selectively direct parsed network flow records to a particular subset of the stream enrichment processing sub-units.

In some cases, the switching operator may be omitted. For instance, a different enrichment processing sub-unit 650 may be deployed to replace/update the existing enrichment processing sub-units. Alternatively, an operator may be deployed in real-time to redirect the parsed network flow records.

The enriched network flow records can then be output using a stream output operator 660. The stream output operator 650 may be configured to output the enriched network flow records as an asynchronous output stream 661 using UDP.

In the example shown in FIG. 6B, a pipe switch operator 640 is connected upstream from an enrichment processing sub-unit 650 that is in turn connected to a Pipe-to-UDP operator 660. This may enable the enriched data stream 651 to be transmitted as a UDP stream 661 to provide loose coupling for the data processing segment. This may allow the data processing segment to be flexibly deployed in a data stream processing system.

Figure 6C:
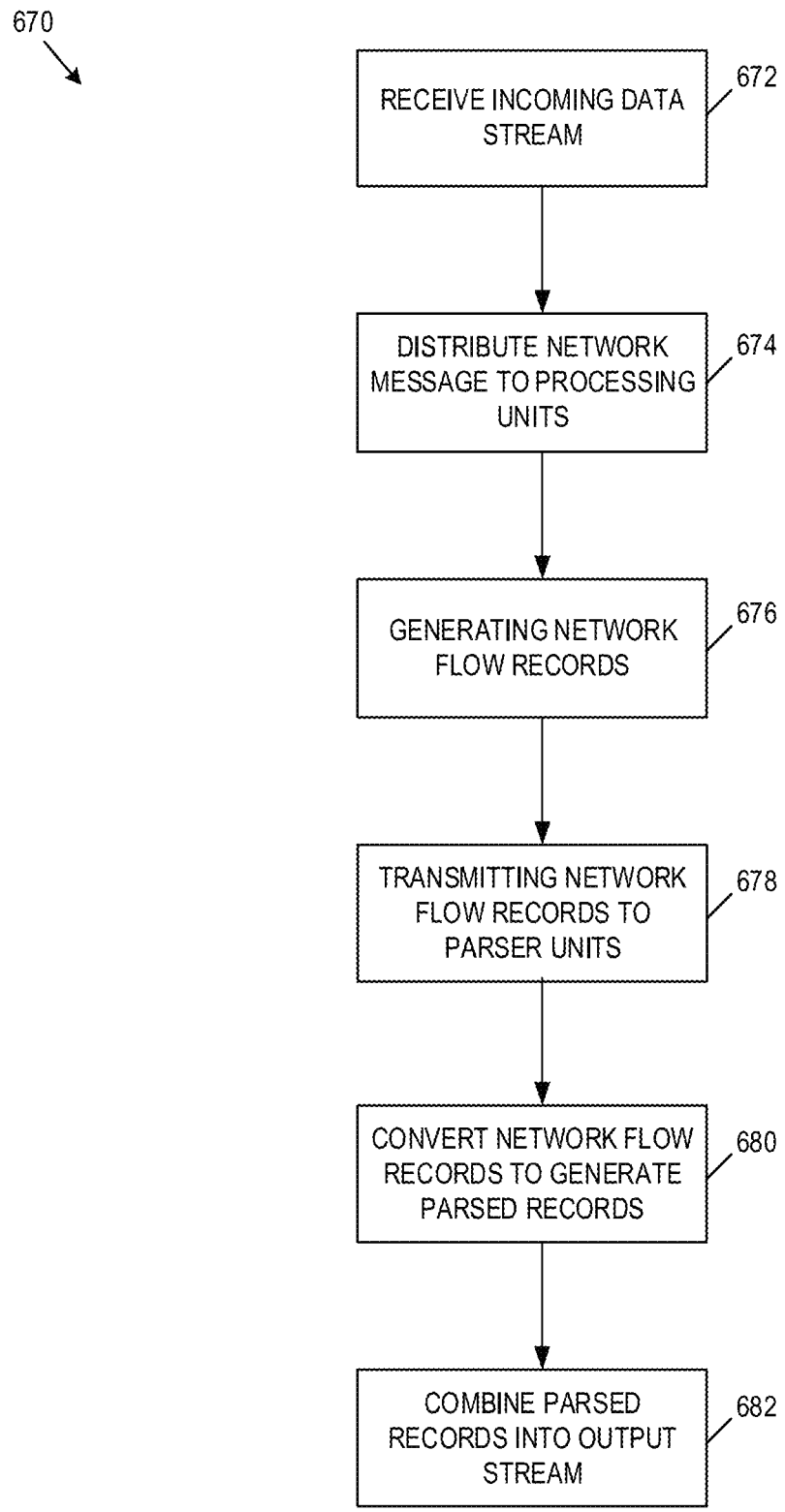
FIG. 6C is a flowchart illustrating a method of processing network data in accordance with an example embodiment.

Referring now to FIG. 6C, shown therein is an example method 670 of processing network flow monitoring data. Method 670 is an example of a method for processing network flow monitoring data that may be implemented using data stream processing system 105, 200a and 200b. For example, method 670 may be implemented using the data stream processing segments shown in FIGS. 6A and 6B.

At 672, at least one incoming data stream of network monitoring messages can be received. For instance, the data stream may include NetFlow messages.

At 674, the network monitoring messages can be distributed amongst a plurality of downstream processing units. The network monitoring messages may be distributing to ensure that the processing load is balanced amongst the downstream processing units. The number of downstream processing units may be selected to accommodate the arrival data rate of the network monitoring messages.

At 676, a plurality of network flow records can be generated from the network monitoring messages. The network flow records may be generated in a first format, such as a JSON format. The downstream processing units can include a plurality of collected sub-units in parallel. Each collector sub-unit may generate network flow records based on the portion of the monitoring messages received at 674.

At 678, the network flow records can be transmitted to a plurality of parser sub-units. Each collector sub-unit may have a corresponding downstream parser sub-unit. The network flow records generated by that collector sub-unit can then be transmitted to the corresponding downstream parser sub-unit.

The first format used to generate the network flow records may generate large files. Accordingly, the collector sub-units and parser sub-units may communicate using TCP to provide increased reliability of data transfer.

At 680, a plurality of parsed network flow records can be generated. The parser sub-units may convert the network flow records from the first format to a second format. The second format may facilitate downstream transmission and analysis. The second format may generate files with a smaller file size than the first format. For instance, the second format may be a CSV format or binary format.

At 682, the plurality of parsed network records from the plurality of parsers can be combined into a single output stream. This may facilitate transmission to downstream storage, processing and/or analysis components. For instance, the parsed network records may be combined into a synchronous output stream. In some cases, the parsed network records may then be enriched with enrichment data that is selected based on the information required by downstream storage and/or analysis applications.

Figure 7A:
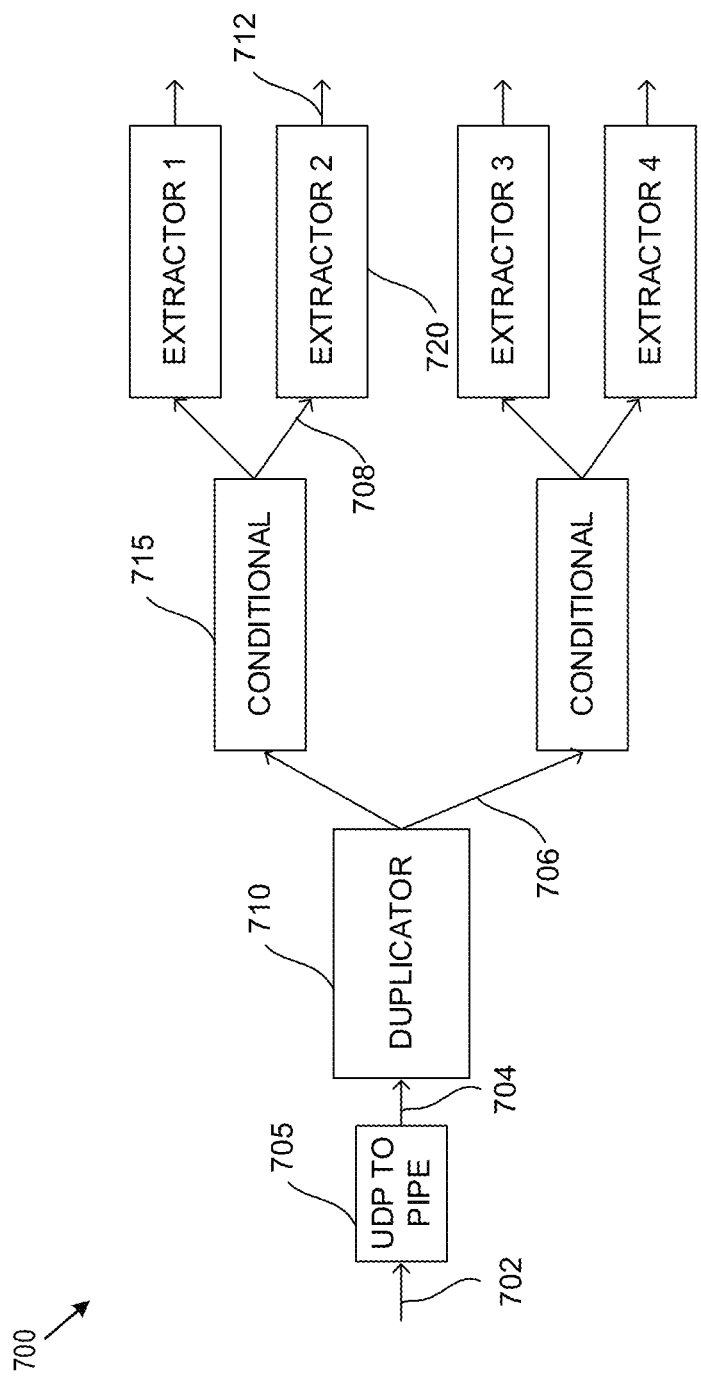
FIGS. 7A-7C are block diagrams of data processing segments that may be used in the data stream processing systems of FIGS. 2A and 2B in accordance with an embodiment.
Figure 7B:
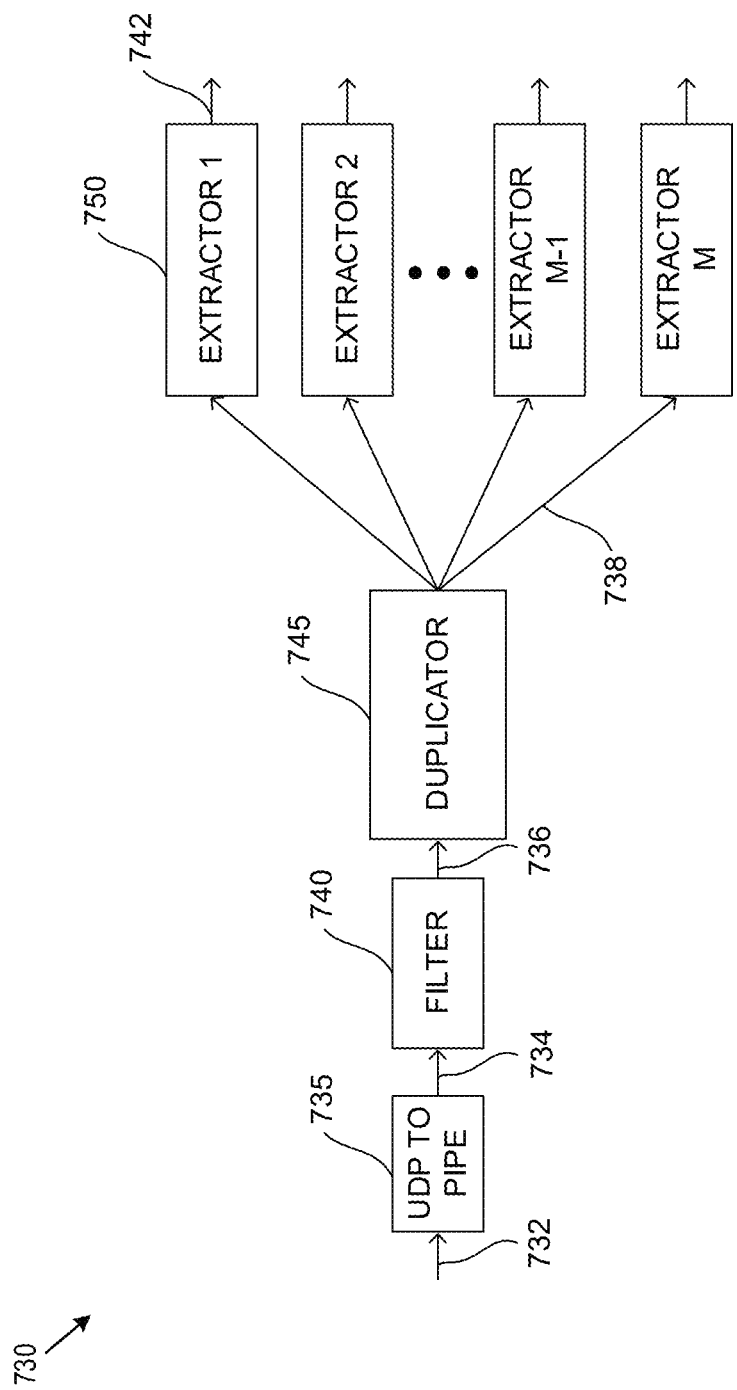
Figure 7C:
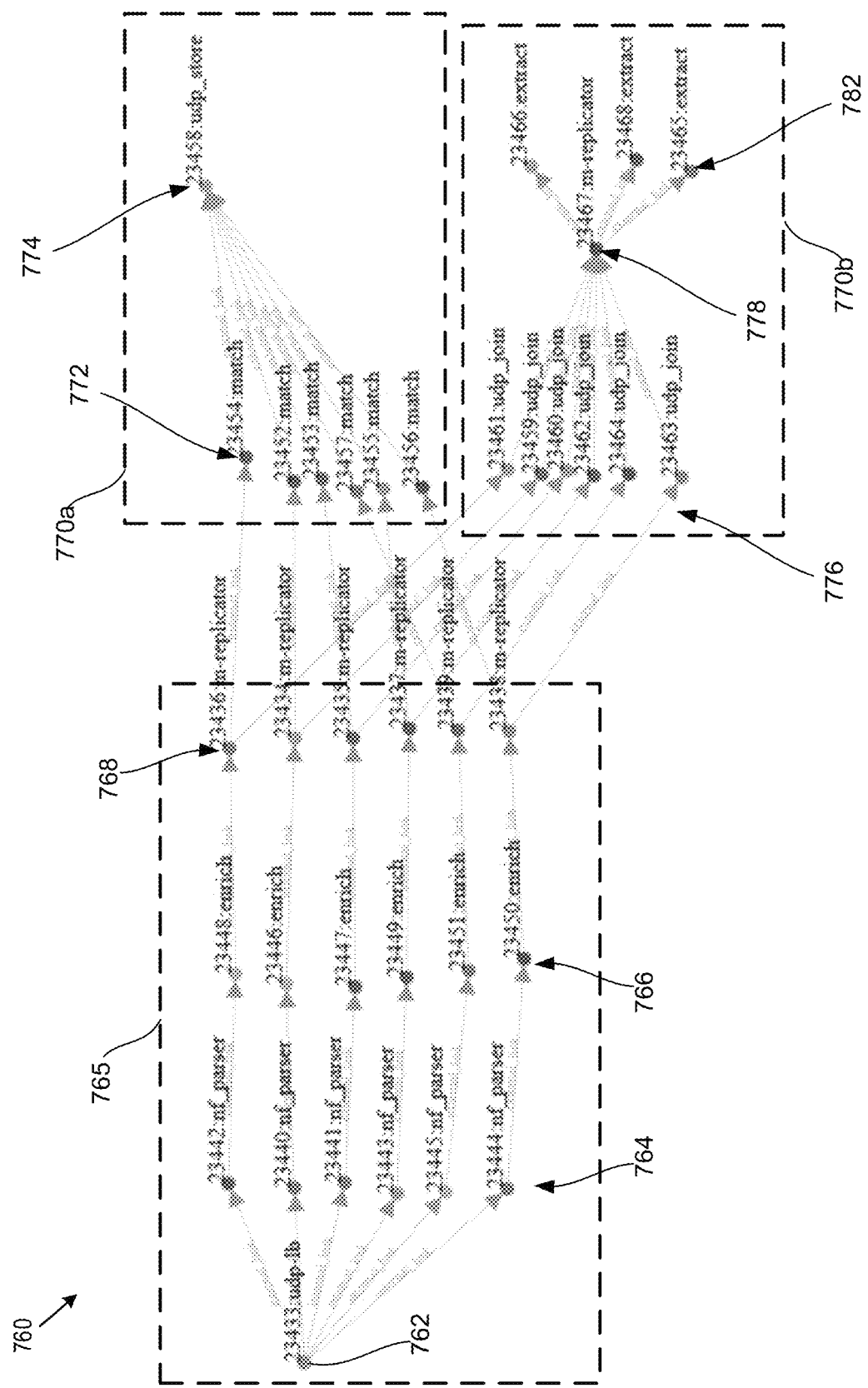

Referring now to FIGS. 7A and 7B, shown therein are examples of data processing segment that may be used to extract features from received network flow records. For example, the data processing segments shown in FIGS. 7A and 7B may be positioned downstream from the data processing segments shown in FIG. 6A or FIG. 6B to receive parsed network flow records or enriched network flow records respectively.

In general, the data processing segments shown in FIGS. 7A and 7B can include a duplicator operator that receives the network flow records. The duplicator operator can be coupled downstream from the combiner operator 630. In embodiments where the network flow records are enriched, the duplicator operator can be coupled downstream from the enrichment data processing sub-unit. The duplicator operator can be configured to replicate the received network flow records (e.g. parsed network flow records or enriched network flow records) and output multiple copies of the received network flow records.

A plurality of feature extraction processing sub-units can be coupled to the duplicator operator. Each feature extraction processing sub-unit can be configured to derive one or more network flow characteristics from the duplicated network flow records.

In some cases, such as embodiments of the data processing segment shown in FIG. 7A, the individual feature extraction processing sub-units may receive different network flow records. In other cases, such as embodiments of the data processing segment shown in FIG. 7B, the individual feature extraction processing sub-units may receive the same network flow records.

FIG. 7A shows a first example of a data processing segment that can be used to extract data features from network flow records. A stream of parsed or enriched network flow records 702 can be received by the stream processing segment shown in FIG. 7A.

In some embodiments, the network flow records 702 may be transmitted using UDP. In such embodiments, a UDP-to-pipe operator 705 can be implemented to transmit the network flow records as a pipe-based stream 704 as shown.

The network flow records can be directed to a duplicator operator 710. The duplicator operator 710 can be configured to replicate the received network flow records 704 and transmit a plurality of replicated network flow record streams 706. Each replicated stream 706 may include all of the network flow records received at 704.

As shown in FIG. 7A, each replicated network flow record 706 can be directed to a conditional operator 715. The conditional operators 715 can control which of the extractors 720 the replicated network flow records 706 are directed to. Each conditional operator 715 can be configured to selectively direct the network flow records between the plurality of feature extraction processing sub-units 720 by determining that the network flow record 715 has a set of characteristics corresponding to the selected feature extraction processing sub-unit 720.

Each conditional operator 715 may include one or more pre-defined conditions that correspond to the downstream extractor sub-units 720. The conditional operator 715 may examine the received network flow records to determine whether they satisfy the conditions. Based the examination of the network flow records, the conditional operator 715 can determine the extractor sub-unit 720 to which that data can be transmitted. For example, the conditional operator 715 may route data between the pair of downstream extractors 720 according to whether the received data 706 corresponds to an ingress or egress network IP address.

Each feature extraction sub-unit 720 can process its received data stream 708 to generate a stream 712 that includes the extracted features. In some cases, the outgoing stream 712 may consist of a steam of extracted features. In other cases, the extracted features can be embedded with a portion or all of the received network flow records.

The outgoing stream 712 can be directed to a corresponding storage and/or analysis application. The analysis application may perform operations on the extracted features in stream 712 to detect events of interest. For example, the analysis application may perform anomaly detection or threat correlation for the selected data stream. The storage application may store the data in the outgoing stream 712 in non-volatile storage.

Configuring a data stream processing system to include the data processing segments shown in FIGS. 6A, 6B and 7A in a processing sub-graph may be used to provide cyber-security monitoring for a network. For example, the processing segment 700 shown in FIG. 7A may be used to extract features from the enriched network flow records received from the processing segment shown in FIG. 6B that are usable by cyber-security monitoring and analysis applications to identify cyber-security events of interest, such as intrusions into the network.

Referring now to FIG. 7B, shown therein is another example of a data processing segment 730 that can be used to extract data features from network flow records. A stream of parsed or enriched network flow records 732 can be received by the stream processing segment shown in FIG. 7B.

In some embodiments, the network flow records 732 may be transmitted using UDP. In such embodiments, a UDP-to-pipe operator 735 can be implemented to transmit the network flow records as a pipe-based stream 734 as shown.

A filter operator 740 can be positioned to receive the network flow records 734. The filter operator 740 can be configured to transmit network flow records 736 having a defined set of characteristics to the duplicator 745. The filter operator 740 can prevent network flow records 734 that do not have the defined set of characteristics from being transmitted to the duplicator 745.

The filter operator 740 can be configured to select only data that corresponds to a pre-defined profile. The selected data can be provided to the duplicator 745 while the other data can be prevented from reaching duplicator 745 and may be discarded. For example, the filter operator may only pass HTTPS traffic or only SSH traffic.

The filtered network flow records 736 can be directed to the duplicator operator 745. The duplicator operator 745 can be configured to replicate the received network flow records 736 and transmit a plurality of replicated network flow record streams 738. Each replicated stream 738 may include all of the filtered network flow records received at 736. Each replicated stream 738 can be transmitted to one of the feature extraction processing sub-units 750.

As shown in FIG. 7B, a plurality of feature extraction processing sub-units 750 can be coupled to the duplicator operator 745. Each feature extraction processing sub-unit 750 can be configured to derive one or more network flow characteristics from the duplicated network flow records 738.

Each feature extraction sub-unit 750 can process its received data stream 738 to generate a stream 742 that includes the extracted features. In some cases, the outgoing stream 742 may consist of a stream of extracted features. In other cases, the extracted features can be embedded with a portion or all of the received network flow records.

Each feature extraction sub-unit 750 can process its received data stream 738 in a different manner. For example, the plurality of feature extraction sub-units 750 may be configured to produce time-lapse graphs for profiles of interest analysis. Each of the feature extraction sub-units 750 may then be configured to process the received data 738 in distinct but overlapping time periods. For example, ten feature extraction sub-units 750 may be configured to process ten minutes of data, but with windows that are shifted by 1 minute relative to each other.

The outgoing stream 742 can be directed to a corresponding data storage and/or analysis application. The analysis application may perform operations on the extracted features in stream 742 to detect events of interest. The storage application may store the data in stream 742, e.g. to allow for later retrieval and/or analysis.

Configuring a data stream processing system to include the data processing segments shown in FIGS. 6A, 6B and 7B in a processing sub-graph may be used to provide network flow monitoring and management for a network. For example, the processing segment 730 shown in FIG. 7B may be used to extract features from the enriched network flow records received from the processing segment shown in FIG. 6B that are usable by network monitoring and analysis applications to identify events of interest, such as network traffic anomalies.

For instance, in the example given above, the plurality of time-lapse graphs generated by the feature extraction sub-units 750 can define a profile store for monitored network data. The network profiles from the feature extraction sub-units 750 may be analyzed using signature-based detection applications or anomaly-detection based learning applications for example. The output from these analysis applications can be used for correlation applications, to drive dashboards, or to initiate remedial network actions for example.

Referring now to FIG. 7C, shown therein is a simplified example of a processing graph 760 in accordance with an embodiment. The processing graph 760 shown in FIG. 7C illustrates a graphical example of how a user can define a processing graph to be implemented by controller 500. As mentioned above, a user may define the processing graph at a high level using a language such as Python. This high-level description can be converted to a visual graph representation, for instance in a JSON format.

The controller 500 may interpret the processing graph 760 in order to retrieve code defining the plurality of data processing sub-units and operators to be deployed. The controller 500 may then deploy the corresponding resources necessary to provide the graph.

The processing graph 760 is an example of a processing graph that can be configured to process a data stream for a plurality of downstream storage and/or analysis applications. The processing graph 760 can include a plurality of independent sub-graphs 770a and 770b. Each of the sub-graphs 770 can be coupled to different outgoing data streams. The sub-graphs 770 can be configured to perform different processing operations based on the storage and/or analysis applications that are connected to their outgoing data streams.

The sub-graphs 770 can be connected to a shared upstream portion 765 of the data processing graph 760. The upstream portion 765 can be configured to perform processing operations that are common for the storage and/or analysis application downstream from both of the processing sub-graphs 770a and 770b. This may provide a more streamlined processing system, by avoiding unnecessary duplication of processing sub-units.

In the example processing graph 760, an incoming data stream can be received by a load-balancing operator 762. The load-balancing operator 762 can be configured to distribute the data from the incoming data stream amongst a plurality of downstream data processing sub-units 764.

In the example shown, the load-balancing operator 762 provides a combined UDP-to-Pipe and load balancing operation. The load-balancing operator 762 may thus convert a received UDP stream to an outgoing pipe-based data stream transmitted to the data processing sub-units 764.

The data processing sub-units 764 can be configured as parser sub-units. Each of the parser sub-units 764 can be coupled to a corresponding downstream enrichment sub-processing unit 766. The parser sub-units 764 and enrichment sub-units 766 may operate as described herein above. By providing a plurality of parser sub-units 764 (as well as corresponding enrichment sub-units 766) in parallel, the incoming data stream can be processed at a much faster rate.

Each of the enrichment data processing sub-units 766 can be connected to a replicator operator 768. Each replicator operator can be connected to both a matching sub-unit 772 in data processing sub-graph 770a and a combiner operator 776 in data processing sub-graph 770b. The replicator operators 768 allow the output from the upstream data processing sub-unit 765 to be distributed amongst a plurality of downstream data processing sub-graphs, where more specialized processing operations (i.e. those more specific to the downstream storage and/or evaluation applications) can be performed to accommodate different storage, analysis or monitoring applications.

In data processing sub-graph 770a, each enriched data stream can be provided to a separate match sub-unit 772. The match sub-units 772 can perform matching operations on the received data stream, and the output from the matching sub-units 772 can be directed to a combiner operator 774. The combiner operator 774 can be used to direct the matched data streams to a data store for further analysis.

In data processing sub-graph 770b, all of the enriched data streams can be provided to combiner operators 776. The combiner operators 776 can be used to combine the enriched data streams into a single data stream. This combined data stream can then be directed to a replicator operator 778. The replicator operator 778 may then transmit multiple copies of the combined data stream to a plurality of extraction sub-units 782. This may ensure that each extraction sub-unit 782 analyzes the same data stream. The output from the extraction sub-units 782 can be provided to data analysis applications for further analysis and/or to data storage applications for storage in non-volatile memory.

Figure 8:
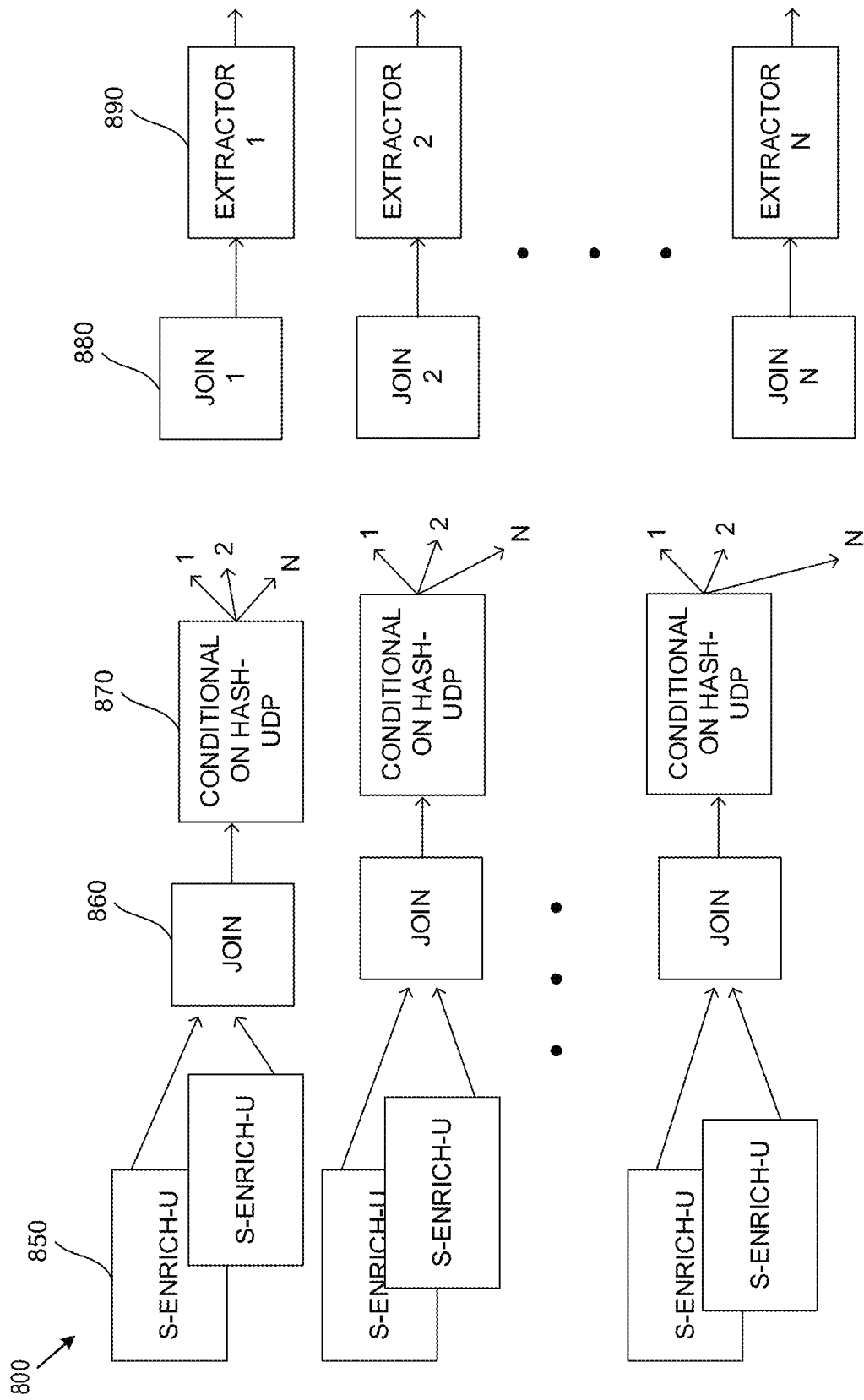
FIG. 8 is a block diagram of another data processing segment that may be used in the data stream processing systems of FIGS. 2A and 2B in accordance with an embodiment.

Referring now to FIG. 8, shown therein is an example of a data processing sub-graph 800. Data processing sub-graph 800 is an example of a data processing sub-graph that can be configured to provide data streams to a plurality of extraction sub-units 890.

In FIG. 8, a plurality of data processing segments 850 can be arranged in parallel. Each of the data processing segments 850 can include the same sequence of input operator, data processing sub-units and output operator. For instance, the data processing sub-units may include a pipe switch operator, enrichment processing sub-unit, and connector operator as shown in the data processing segment of FIG. 6B.

The data processing segments 850 can be connected to a plurality of combiner operators 860. The combiner operators 860 can be configured to combine the enriched data streams from two or more enrichment data processing segments 850. For instance, the combiner operators 860 may be configured to receive UDP streams from each segment 850 and combine them into a single stream.

The combined streams can then be provided to conditional operators 870. The conditional operators 870 can distribute the received streams into a plurality of outgoing streams by identifying the corresponding feature extraction sub-unit 890 for the given data block. For instance, the conditional operator 870 may use a hash function to identify the feature extraction sub-units 890 corresponding to each block of data. The conditional operator 870, for each parallel segment, can then direct the data to the sub-graph for the appropriate feature extraction sub-unit 890.

Each feature extraction sub-unit 890 can be coupled to an upstream combiner operator 880. The combiner operator 880 can be configured to receive data streams from some or all of the conditional operators 870, so that the data processed by each segment can be routed to each feature extraction sub-unit 890. The combiner operators 880 can then provide a single combined stream to each feature extraction sub-unit 890. The combined stream can include data from all the processing segments, having been routed based on the conditions defined in the conditional operators 870 that operate in parallel. This may provide a high throughput architecture for routing data to a large number of different feature extraction sub-units 890.

Figure 9:
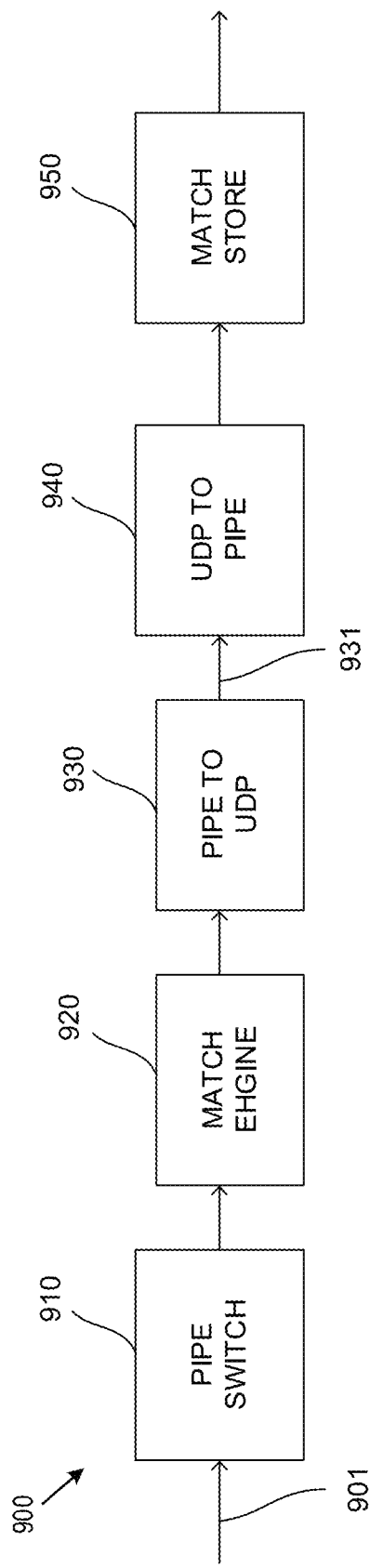
FIG. 9 is a block diagram of a data analysis segment that may be used in the data processing computer network system of FIG. 1 in accordance with an embodiment.
Figure 10:
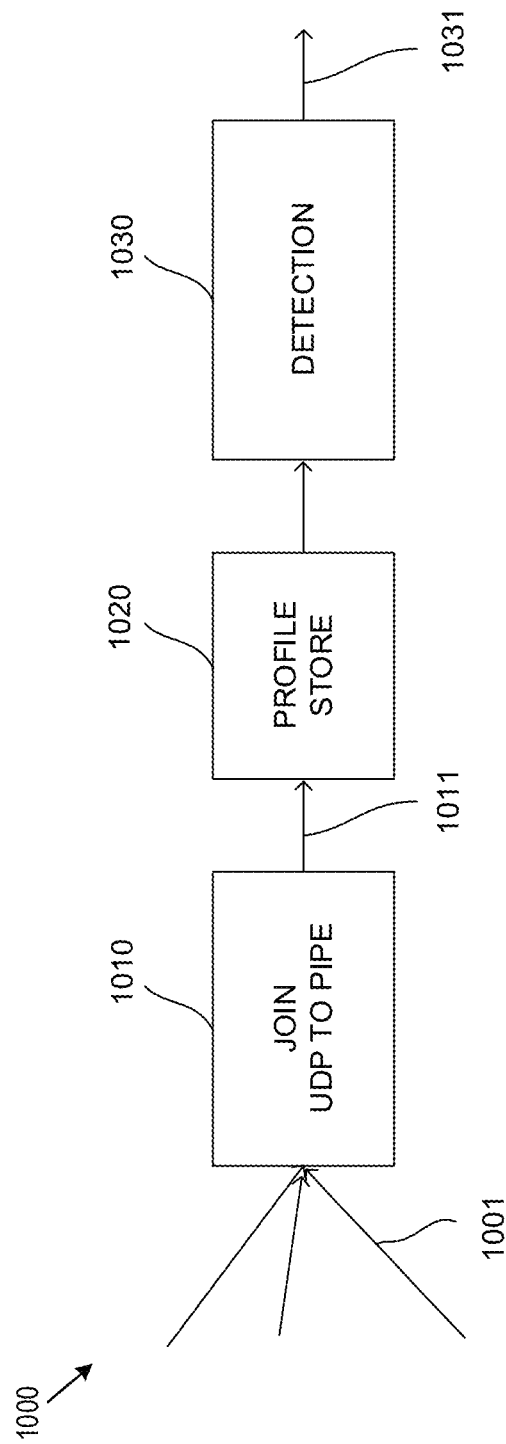
FIG. 10 is a block diagram of another data analysis segment that may be used in the data processing computer network system of FIG. 1 in accordance with an embodiment.

Referring now to FIGS. 9 and 10, shown therein are examples of data analysis sub-graphs. The data analysis sub-graphs shown in FIGS. 9 and 10 are examples of data routing and analysis systems that may be used to analyze processed data received from a data stream processing system, such as systems 105, 200a and 200b.

Various event detection applications may be used with embodiments of the data stream processing systems described herein. For instance, threat-intelligence detection applications may be used to provide real-time correlation against threats reported by commercial and open-source feeds, Host-Based detections, and internal Honey-pot based detections, DPI, etc. Signature-based detection applications may be used to profile every IP address seen in the network, extract dozens of features per address, use graph analytics, and identify and detect in real-time known/targeted threat patterns. In other examples, unknown anomalous behaviors may be identified using unsupervised and/or semi-supervised machine learning-techniques that profile IP addresses using time-lapsed moving graphs to learn normal behavior and identify anomalous behavior.

FIG. 9 shows an example of an analysis system 900 that may be used to provide cyber-security analysis functions. For example, the analysis system 900 may be coupled downstream from a data stream processing system that incorporates the data processing segments shown in FIGS. 6A, 6B and 7A. Analysis system 900 can be configured to analyze an incoming data stream to detect threats using a correlator.

Analysis system 900 can receive an incoming data stream 901. Data stream 901 is a processed data stream that has been suitably filtered and/or enriched using a data stream processing system such as those described herein. For instance, data stream 901 may include data features extracted using feature extraction sub-units.

A data processing segment comprising a pipe switch operator 910, match engine sub-unit 920, and pipe-to-UDP operator 930 can perform correlation operations on the received data stream 901. The pipe switch operator 910 may facilitate updating the match engine 920 on the fly.

For example, the match engine sub-unit 920 may compare the received data stream 901 against known threats identified using open source or commercial feeds, or from other threat detection applications. For instance, the match sub-unit 920 may compare the IP addresses of data in the received data stream 901 against IP addresses of known threats. The match sub-unit 920 may also use various other matching templates, such as signature-based templates or templates from anomaly-detection applications for example.

A stream 931 including identified threats can be routed to a match store 950 using a connector operator 940. The match store 950 may be used to store a list of identified threats and associated data. The match store 950 may also provide feedback to an administrator user to assist in identifying and prioritizing detected threats. In some cases, the stream of detector threats 931 may be directed to automated alerting or response sub-units that may generate alerts or trigger remedial action in response to the detected threats.

Referring now to FIG. 10, shown therein is an example of an analysis system 1000. Analysis system 1000 is another example of an analysis system that may be used to detect cyber-security threats and other events of interest. The analysis system 1000 can receive processed data streams 1001 from the output of a data stream processing system such as systems 105, 200*a* and 200*b*.

Analysis system 1000 is an example of a system configured to detect threats using signature-based applications or anomaly detection applications. The data streams 1001 have been filtered based on profiles of interest and processed using multiple feature extraction sub-units (e.g. using the data processing segment 730 shown in FIG. 7B). The data streams output from the feature extraction sub-units can be combined into a single analysis data stream 1011 using a combiner operator 1010. The combined analysis data stream 1011 can be directed to a profile store 1020.

A detection application 1030 can process information from the profile store 1020 to detect threats. For example, the detection application 1030 may provide signature-based detection (e.g., decision-trees based on extracted features or ratios of extracted features) to identify new threats. In another example, the detection application 1030 may use anomaly detection based on analytics or machine learning to identify new threats. The outputs from one or more such detection applications 1030 may then be used as an input feed to a correlation engine such as match unit 920, as inputs to a user dashboard, or in triggering actions and responses to mitigate new threats.

Embodiments of the data stream processing systems, method and computer program products described herein may facilitate ingestion and processing of large volumes of data. Data processing sub-units can be interconnected using a plurality of operators to ensure that received data streams are suitably processed for various storage, analysis and monitoring applications.

Data processing sub-units can be configured to perform processing operations—such as parsing, filtering, enriching, transforming (e.g. compressing, expanding), extracting, analyzing, storing, matching—on a received data stream and output a modified data based on the operations performed. The data processing sub-units may be implemented using high performance languages such as C/C++.

The operators can route data between the plurality of data processing sub-units and provide required connectivity between different data processing sub-units. The operators can route data using various criteria, such as load balancing, conditional routing, switching, replication, joining etc. The operators may also modify the communication protocols used to transmit data to provide low latency as well as increased flexibility in connections between the data processing sub-units.

The plurality of data processing sub-units and operators can be arranged in a feedforward data processing graph. The data processing graph may include parallel segments of data processing sub-units and operators to increase system throughput and performance. The operators can also be configured to dynamically adjust the connections between data processing sub-units and data processing segments to facilitate resource scaling as required. This may reduce, or prevent, data throttling through the data stream processing system.

The inventors have found that embodiments of the systems, methods and computer program products described herein can process events at least ten times more efficiently than existing "best approaches" such as Spark, Hadoop, and ELK using the same computational resources. Embodiments described herein may be implemented to process more than 150,000 events per second and upwards of millions of events per second. This high event throughput may allow system monitoring with little or no subsampling in large networks. This can facilitate real-time analysis and detection with greater accuracy as all, or almost all, the monitoring data for the network can be processed and analyzed.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

We claim:

1. A system for processing network flow monitoring data comprising:
a data collection input coupled to at least one incoming data stream of network monitoring messages; and
a data processing segment comprising:
a load balancing operator coupled to the data collection input, the load balancing operator operable to distribute the network monitoring messages, for processing, amongst a plurality of downstream collector processing sub-units coupled to the load balancing operator, wherein the load balancing operator is configured to distribute the network monitoring messages based on a performance of one or more of the plurality of collector processing sub-units;
a data processing sequence that includes:
the plurality of collector processing sub-units, wherein the collector processing sub-units are operable to generate network flow records from the received network monitoring messages, wherein the network flow records are generated in a first format and the collector processing sub-units are configured to generate the network flow records by augmenting the received network monitoring messages with additional information; and a plurality of parser sub-units coupled to the plurality of collector processing sub-units, each parser sub-unit operable to receive the network flow records from one of the collector processing sub-units and to generate parsed network flow records by converting the received network flow records from the first format to a second format;

a combiner operator coupled to the plurality of parser sub-units, wherein the combiner operator is operable to combine the parsed network flow records from the plurality of parser sub-units into a synchronous output data stream; and a data processing sub-unit configured to generate a profile store utilizing graphs, wherein the profiles from the profile store may be analyzed by either detection applications or machine learning, wherein the result of the analysis may be utilized for at least one of correlating applications, interacting with dashboards, or facilitating remedial network actions;

wherein the plurality of parser sub-units are directly connected to the plurality of collector processing sub-units within the data processing sequence;

the plurality of parser sub-units are directly connected to the combiner operator;

the plurality of collector processing sub-units are directly connected to the load balancing operator; and data flows through the data processing segment sequentially from the load balancing operator to the plurality of collector processing sub-units to the plurality of parser sub-units to the combiner operator.

2. The system of claim 1, wherein the load balancer operator is configured to transmit the network monitoring messages to the plurality of collector processing sub-units using the User Datagram Protocol (UDP).

3. The system of claim 1, wherein each parser sub-unit is configured to generate the parsed network flow records in a CSV file format.

4. The system of claim 1, wherein each parser sub-unit is configured to transmit the parsed network flow records using the User Datagram Protocol (UDP).

5. The system of claim 1, further comprising:
at least one stream enrichment processing sub-unit coupled downstream from the combiner operator, each stream enrichment processing sub-unit operable to generate enriched network flow records by inserting enrichment data into the parsed network flow records.

6. The system of claim 5, further comprising:
a stream output operator coupled to the at least one stream enrichment processing sub-unit, the stream output operator configured to output the enriched network flow records using the User Datagram Protocol (UDP).

7. The system of claim 1, further comprising:
a duplicator operator coupled downstream from the combiner operator, the duplicator operator configured to duplicate the received network flow records; and
a plurality of feature extraction processing sub-units coupled to the duplicator operator, each feature extraction processing sub-unit operable to derive one or more network flow characteristics from the duplicated network flow records.

8. The system of claim 7, further comprising:
a plurality of conditional operators coupled between the duplicator and the plurality of feature extraction processing sub-units, wherein each conditional operator is operable to selectively direct the network flow records between the plurality of feature extraction processing sub-units by determining that the network flow record has a characteristic corresponding to the selected feature extraction processing sub-unit.

9. The system of claim 7, further comprising:
a filter operator coupled upstream from the duplicator, wherein the filter operator is operable to transmit network flow records having a defined set of characteristics to the duplicator and to prevent network flow records that do not have the defined set of characteristics from being transmitted to the duplicator.

10. The system of claim 1, further comprising at least one data output unit coupled downstream of the combiner operator, wherein the at least one data output unit comprises at least one of a data analysis application and a real-time storage application.

11. A method of processing network flow monitoring data, the method comprising:
receiving at least one incoming data stream of network monitoring messages;

directing the network monitoring messages to a data processing segment comprising a load balancing operator, a data processing sequence that includes a plurality of collector processing sub-units and a plurality of parser sub-units, and a combiner operator, wherein the plurality of parser sub-units are directly connected to the plurality of collector processing sub-units, the plurality of parser sub-units are directly connected to the combiner operator, and the plurality of collector processing sub-units are directly connected to the load balancing operator such that data flows through the data processing segment sequentially from the load balancing operator to the plurality of collector processing sub-units to the plurality of parser sub-units to the combiner operator;

distributing by the load balancing operator, for processing, the network monitoring messages amongst the plurality of collector processing sub-units based on a performance of one or more of the plurality of collector processing sub-units;

generating, by the plurality of collector processing sub-units, network flow records from the received network monitoring messages, wherein the network flow records are generated in a first format and the network flow records are generated by augmenting the received network monitoring messages with additional information;

transmitting, by the plurality of collector processing sub-units, the network flow records to a plurality of parser processing sub-units downstream from the collector processing sub-units;

generating, by the plurality of parser processing sub-units, parsed network flow records by converting the received network flow records from the first format to a second format;

combining, by the combiner operator, the parsed network flow records from the plurality of parser sub-units into a synchronous output data stream; and generating a profile store utilizing graphs, wherein the profiles from the profile store may be analyzed by either detection applications or machine learning, wherein the result of the analysis may be utilized for at least one of correlating applications, interacting with dashboards, or facilitating remedial network actions.

12. The method of claim 11, wherein the network monitoring messages are distributed amongst the plurality of collector processing sub-units using the User Datagram Protocol (UDP).

13. The method of claim 11, wherein the parsed network flow records are generated in a CSV file format.

14. The method of claim 11, wherein the parsed network flow records are output from the parser processing sub-units using the User Datagram Protocol (UDP).

15. The method of claim 11, further comprising generating enriched network flow records by inserting enrichment data into the parsed network flow records.

16. The method of claim 15, further comprising transmitting the enriched network flow records using the User Datagram Protocol (UDP).

17. The method of claim 11, further comprising:
duplicating the network flow records;
transmitting the duplicated network flow records to a plurality of feature extraction processing sub-units; and
deriving, by each feature extraction processing sub-unit, one or more network flow characteristics from the duplicated network flow records.

18. The method of claim 17, wherein transmitting the duplicated network flow records to the plurality of feature extraction processing sub-units comprises selectively directing each network flow record between the plurality of feature extraction processing sub-units by determining that the network flow record has a characteristic corresponding to the selected feature extraction processing sub-unit.

19. The method of claim 17, further comprising:
filtering the network flow records prior to duplication, wherein network flow records having a defined set of characteristics are duplicated and network flow records that do not have the defined set of characteristics are prevented from passing through the filter.

20. The method of claim 11, further comprising routing the output data stream to at least one data output unit, wherein the at least one data output unit comprises at least one of a data analysis application and a real-time storage application.

21. A computer program product comprising a non-transitory computer-readable medium having computer-executable instructions stored therein, the computer-executable instructions being executable by a processor to configure the processor to perform a method of processing network flow monitoring data, wherein the method comprises:

receiving at least one incoming data stream of network monitoring messages;

directing the network monitoring messages to a data processing segment comprising a load balancing operator, a data processing sequence that includes a plurality of collector processing sub-units and a plurality of parser sub-units, and a combiner operator, wherein the plurality of parser sub-units are directly connected to the plurality of collector processing sub-units, the plurality of parser sub-units are directly connected to the combiner operator, and the plurality of collector processing sub-units are directly connected to the load balancing operator such that data flows through the data processing segment sequentially from the load balancing operator to the plurality of collector processing sub-units to the plurality of parser sub-units to the combiner operator;

distributing by the load balancing operator, for processing, the network monitoring messages amongst the plurality of collector processing sub-units based on a performance of one or more of the plurality of collector processing sub-units;

generating, by the plurality of collector processing sub-units, network flow records from the received network monitoring messages, wherein the network flow records are generated in a first format and the network flow records are generated by augmenting the received network monitoring messages with additional information;

transmitting, by the plurality of collector processing sub-units, the network flow records to a plurality of parser processing sub-units downstream from the collector processing sub-units;

generating, by the plurality of parser processing sub-units, parsed network flow records by converting the received network flow records from the first format to a second format;

combining, by the combiner operator, the parsed network flow records from the plurality of parser sub-units into a synchronous output data stream; and generating a profile store utilizing graphs, wherein the profiles from the profile store may be analyzed by either detection applications or machine learning, wherein the result of the analysis may be utilized for at least one of correlating applications, interacting with dashboards, or facilitating remedial network actions.

* * * * *